US012587759B2

(12) United States Patent (10) Patent No.: US 12,587,759 B2
Kito et al. (45) Date of Patent: Mar. 24, 2026

(54) SOLID-STATE IMAGING DEVICE AND IMAGING APPARATUS

(71) Applicant: Nuvoton Technology Corporation Japan, Kyoto (JP)

(72) Inventors: Takayasu Kito, Osaka (JP); Norihiko Sumitani, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 107 days.

(21) Appl. No.: 18/543,731

(22) Filed: Dec. 18, 2023

(65) Prior Publication Data

US 2024/0121528 A1 Apr. 11, 2024

Related U.S. Application Data

(63) Continuation of application No. PCT/JP2022/019634, filed on May 9, 2022.

(30) Foreign Application Priority Data

Jun. 22, 2021 (JP) ................................. 2021-103226

(51) Int. Cl.
H04N 25/68 (2023.01)
H04N 25/77 (2023.01)
(52) U.S. Cl.
CPC ............. H04N 25/68 (2023.01); H04N 25/77 (2023.01)
(58) Field of Classification Search
CPC ...... H04N 25/68; H04N 25/77; H04N 25/703; H04N 25/78; H04N 25/69
USPC ....................................................... 348/308
See application file for complete search history.

(56) References Cited

U.S. PATENT DOCUMENTS

| | | | | |
|---|---|---|---|---|
| 7,327,393 | B2 * | 2/2008 | Ying ...................... | H04N 25/51 |
| | | | | 348/E3.018 |
| 11,064,146 | B2 * | 7/2021 | Sambonsugi .......... | H04N 25/77 |
| 2013/0135503 | A1 * | 5/2013 | Park .................... | G11C 27/026 |
| | | | | 327/345 |
| 2019/0110010 | A1 * | 4/2019 | Yamamoto ............. | H04N 25/78 |
| 2020/0128200 | A1 * | 4/2020 | Sambonsugi .......... | H04N 25/78 |

(Continued)

FOREIGN PATENT DOCUMENTS

| | | |
|---|---|---|
| JP | 2017-184075 A | 10/2017 |
| JP | 2020-123795 A | 8/2020 |

OTHER PUBLICATIONS

International Search Report dated Jul. 12, 2022 issued in International Patent Application No. PCT/JP2022/019634, with English translation.

*Primary Examiner* — Lin Ye
*Assistant Examiner* — Chan T Nguyen
(74) *Attorney, Agent, or Firm* — Rimon P.C.

(57) ABSTRACT

A solid-state imaging device includes a plurality of pixel circuits arranged in rows and columns; and a relief unit which includes N signal lines and n pixel circuits among the plurality of pixel circuits, N being an integer greater than or equal to 3, n being an integer less than or equal to N. Each of the n pixel circuits is connected to a group of at least two signal lines out of the N signal lines, and selectively outputs a pixel signal to one of the at least two signal lines included in the group; and n groups corresponding to the n pixel circuits have mutually different combinations of signal lines, the n groups each being the group.

13 Claims, 20 Drawing Sheets

(56)     References Cited

U.S. PATENT DOCUMENTS

| 2020/0244912 | A1* | 7/2020 | Sakurai | ............... H04N 25/778 |
| 2022/0094874 | A1 | 3/2022 | Asakura | |

* cited by examiner

Figure 13:
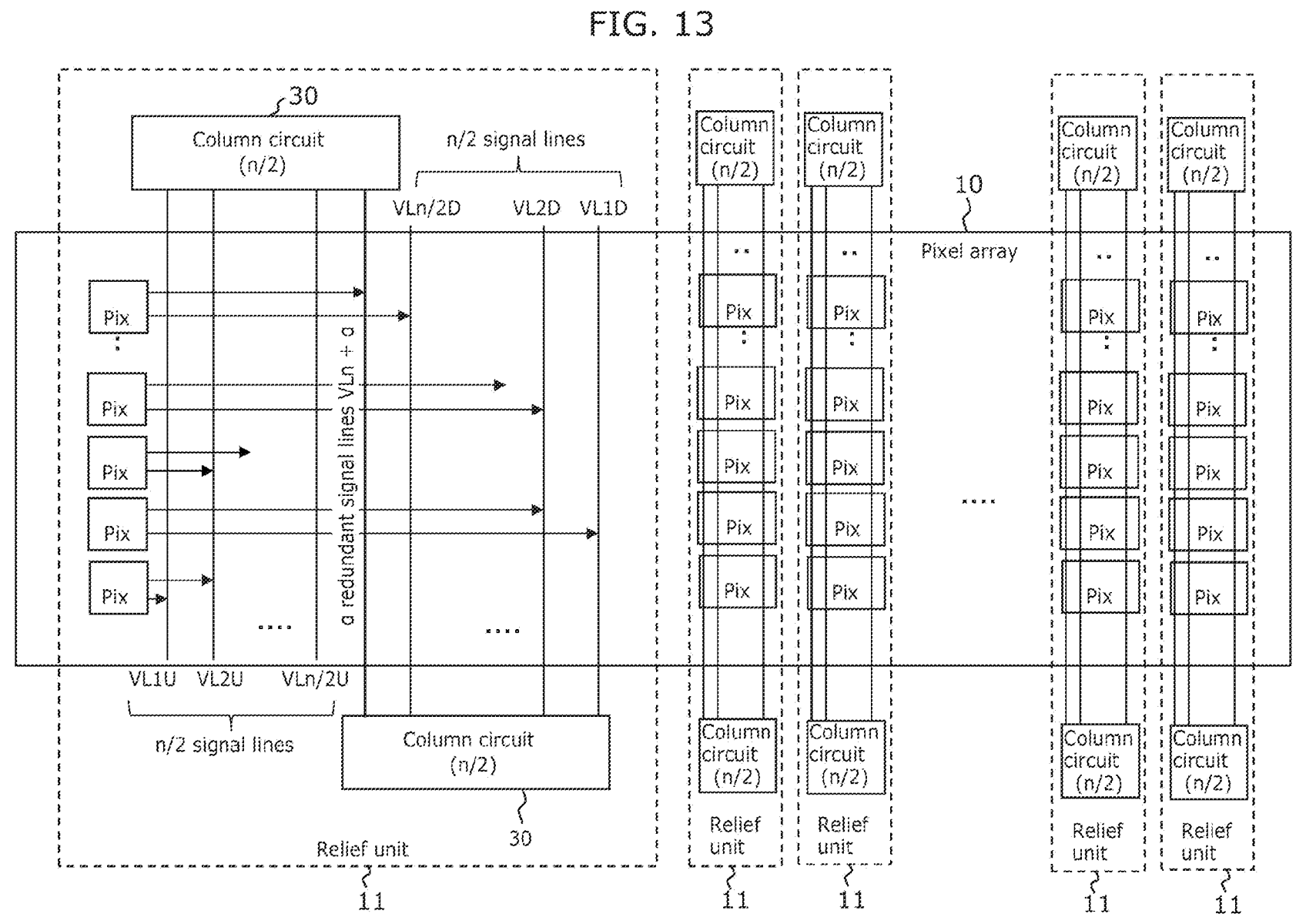

Pixel array

10

Column circuit (n/2)  · ·  Pix · · Pix  Pix  Pix  Pix  Column circuit (n/2)  Relief unit  11

Column circuit (n/2)  · ·  Pix · · Pix  Pix  Pix  Pix  Column circuit (n/2)  Relief unit  11

· · · ·

Column circuit (n/2)  · ·  Pix · · Pix  Pix  Pix  Pix  Column circuit (n/2)  Relief unit  11

Column circuit (n/2)  · ·  Pix · · Pix  Pix  Pix  Pix  Column circuit (n/2)  Relief unit  11 n/2 signal lines

VL1D  VL2D  · · ·  VLn/2D

30  Column circuit (n/2)

a redundant signal lines VLn + a

· · · ·

Column circuit (n/2)  30

Pix  · ·  Pix  Pix  Pix  Pix

VL1U  VL2U  · · ·  VLn/2U n/2 signal lines

Relief unit  11

SOLID-STATE IMAGING DEVICE AND IMAGING APPARATUS

CROSS REFERENCE TO RELATED APPLICATIONS

This is a continuation application of PCT International Application No. PCT/JP2022/019634 filed on May 9, 2022, designating the United States of America, which is based on and claims priority of Japanese Patent Application No. 2021-103226 filed on Jun. 22, 2021. The entire disclosures of the above-identified applications, including the specifications, drawings and claims are incorporated herein by reference in their entirety.

FIELD

The present disclosure relates to a solid-state imaging device and an imaging apparatus.

BACKGROUND

The number of pixels in image sensors has been increasing and image sensors have been becoming faster, and wiring lines in the pixel array have also been increasing in number accordingly. When wiring density increases, the probability of open/short defects occurring in the wiring area increases. In the case of a failure of a unit pixel cell, the failure is a flaw failure by which only one pixel is affected, and when a total number of flaws is small in a chip, the image quality degradation caused by correction processing is minor and can be addressed by correction. It is thus possible in many cases to ship the product as a non-defective product. On the other hand, in the case of line defects, the image quality degradation due to correction is significant because the regions that require correction are adjacent to each other and the range of correction is large. Accordingly, when even a single line defect is found in a chip, the solid-state imaging device itself is treated as defective in many cases. Line defects could lead to an increase in the failure rate of image sensor chips.

In view of the above, a technique to reduce the failure rate by using a redundant circuit to perform relief when a failure occurs has been considered. Patent Literature (PTL) 1 discloses a technique that includes two output circuits and two signal lines for one pixel, and uses an output path in which there is no failure.

PTL 2 discloses a technique that includes one redundant signal line per n signal lines, and avoids a wiring defect by connecting each of the n signal lines and one redundant signal line with a switch.

CITATION LIST

Patent Literature

PTL 1: Japanese Unexamined Patent Application Publication No. 2017-184075
PTL 2: Japanese Unexamined Patent Application Publication No. 2020-123795

SUMMARY

Technical Problem

However, according to PTL 1 that is a conventional technique, each pixel circuit is provided with a redundancy relief circuit and a redundant signal line, which has the disadvantages including: requiring twice as many output circuits and signal lines; requiring a larger area for redundancy relief; and increasing the wiring density further due to a large number of redundancy relief wiring lines, which in turn increases the probability of failures occurring.

On the other hand, according to PTL 2 that is a conventional technique, a single redundancy relief signal line per n signal lines is sufficient, and thus it is possible to perform redundancy relief with a small area. However, all switches connecting to the remaining n signal lines are connected to the specific wiring line for redundancy relief, and it is a technique of, when a failure occurs, avoiding an open defect by connecting the signal line in which the failure has occurred and the redundant signal line with the switch. Accordingly, the wiring load of the signal line for redundancy relief will be added, while the wiring load of the signal line in which the failure has occurred remains connected. In other words, the wiring load on the signal line on which redundancy relief has been performed becomes very large compared to a signal line on which redundancy relief has not been performed. As a result, the readout time for pixel signals becomes slower compared to the case of the signal line on which redundancy relief is not performed, which leads to a decrease in frame rate. In addition, since relief is carried out while a failed signal line remains connected, it is not possible to relieve the short defect of signal lines.

In view of the above, the present disclosure provides a solid-state imaging device and an imaging apparatus that relieve both an open defect and a short defect with less redundancy while preventing a decrease in readout speed.

Solution to Problem

In order to solve the above described problem, a solid-state imaging device according to an aspect of the present disclosure includes: a plurality of pixel circuits arranged in rows and columns; and a relief unit. In the solid-state imaging device: the relief unit includes N signal lines and n pixel circuits among the plurality of pixel circuits, N being an integer greater than or equal to 3, n being an integer less than or equal to N; each of the n pixel circuits is connected to a group of at least two signal lines out of the N signal lines, and selectively outputs a pixel signal to one of the at least two signal lines included in the group; and n groups corresponding to the n pixel circuits have mutually different combinations of signal lines, the n groups each being the group.

Advantageous Effects

With the solid-state imaging device and the imaging apparatus of the present disclosure, it is possible to relieve both an open defect and a short defect with less redundancy while preventing a decrease in readout speed.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 is a diagram illustrating an example of the configuration of a pixel array and a column circuit in the solid-state imaging device according to Embodiment 1.

FIG. 13 is a diagram illustrating an example of the configuration of a pixel array and a column circuit in a solid-state imaging device according to Embodiment 2.

FIG. 14 is an explanatory diagram illustrating an example of relief operation for wiring defect in the solid-state imaging device according to Embodiment 2.

FIG. 15 is a diagram illustrating a variation of a pixel array and column circuits in the solid-state imaging device according to Embodiment 2.

DESCRIPTION OF EMBODIMENTS

Hereinafter, embodiments for implementing the present technique will be described. It should be noted that each of the exemplary embodiments described below shows one specific example of present disclosure. The numerical values, shapes, materials, structural components, the arrangement and connection of the structural components, steps, the processing order of the steps etc. described in the following embodiments are mere examples, and therefore do not limit the scope of the present disclosure.

Embodiment 1

First, the configuration of solid-state imaging device 100 according to the present embodiment will be described.

Figure 1:
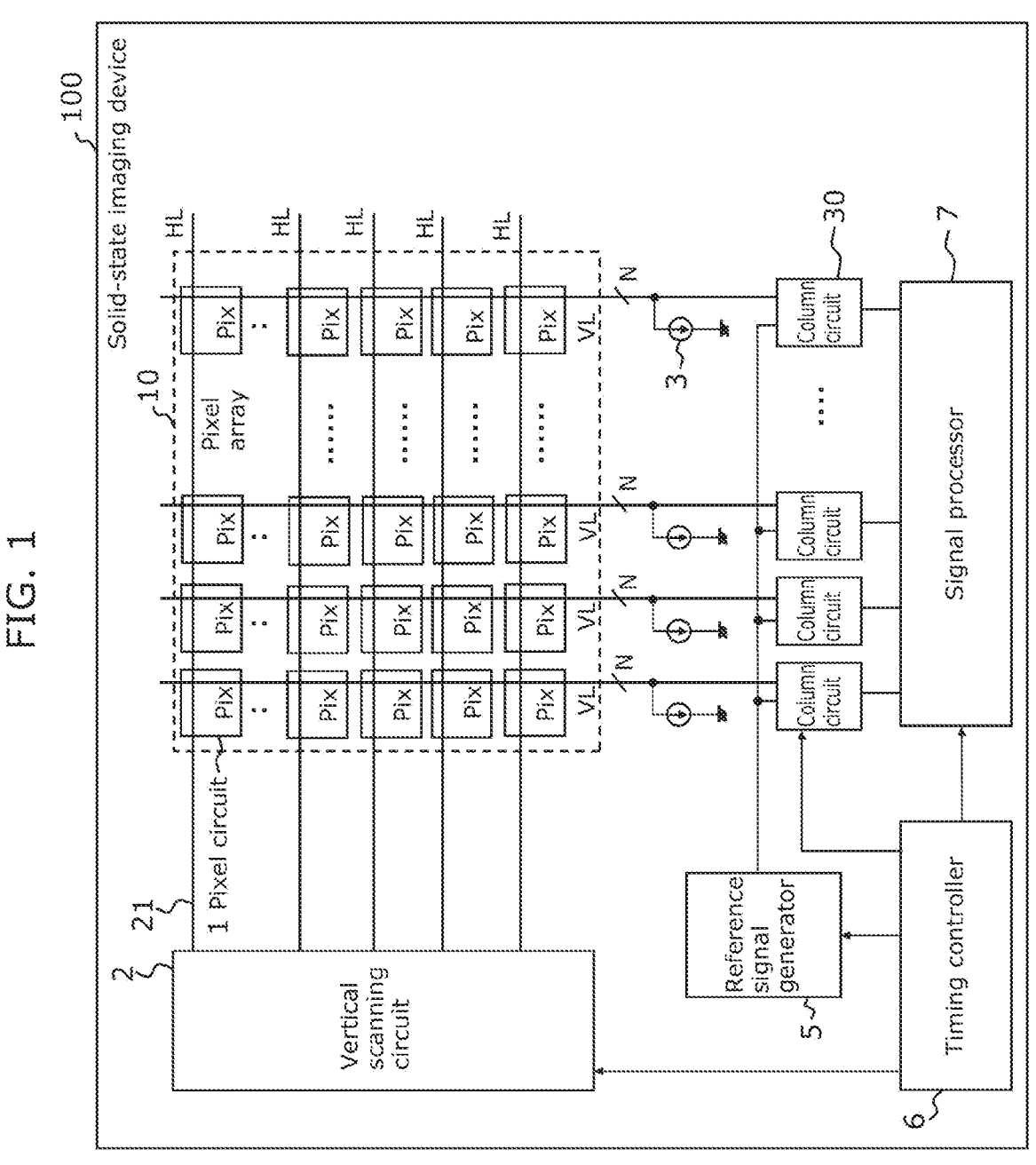
FIG. 1 is a diagram illustrating an example of a configuration of a solid-state imaging device according to Embodiment 1.
Figure 2:
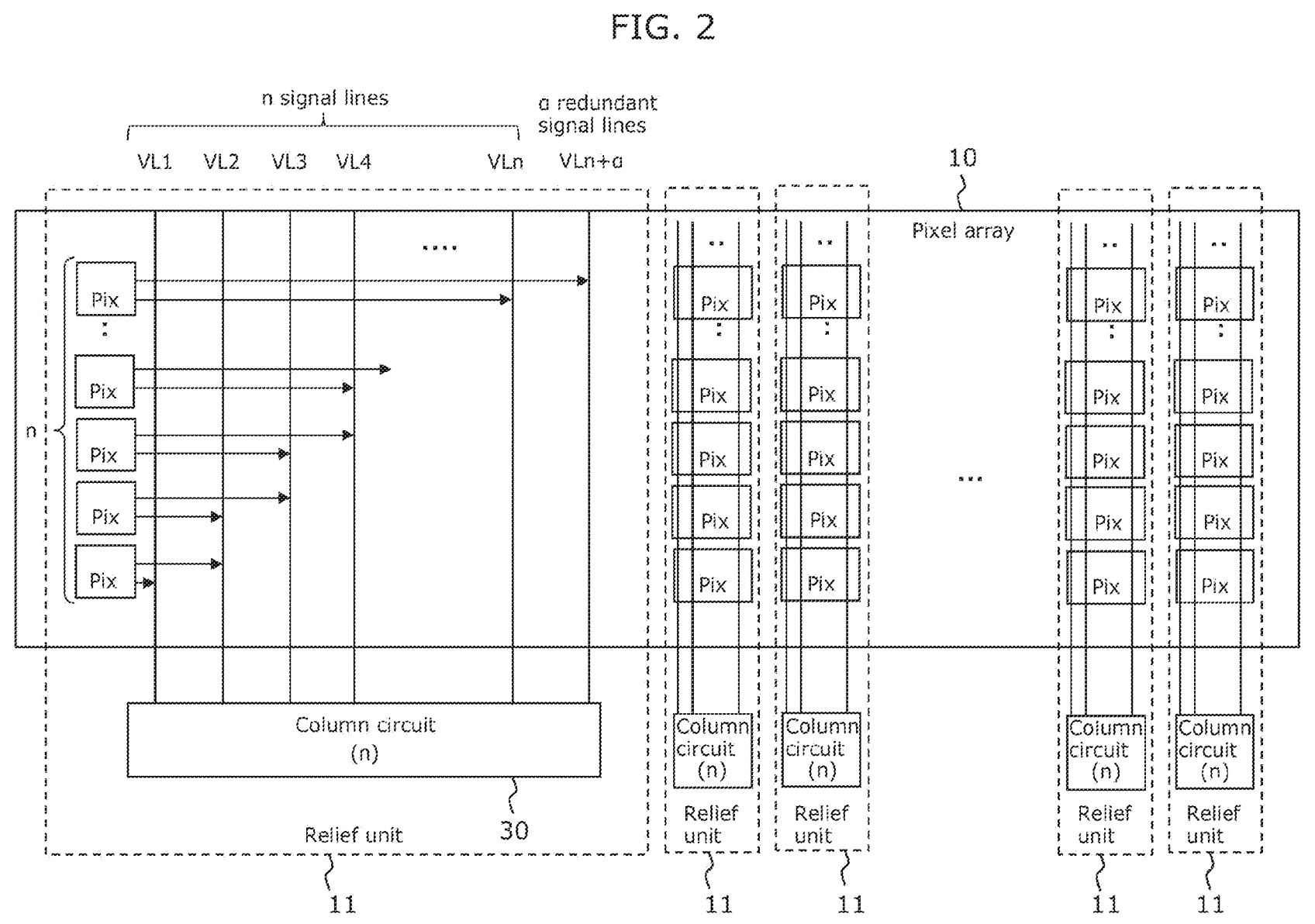

FIG. 1 is a diagram illustrating an example of the configuration of solid-state imaging device 100 according to Embodiment 1. FIG. 2 is a diagram illustrating an example of the configuration of a pixel array and a column circuit in the solid-state imaging device according to Embodiment 1.

Solid-state imaging device 100 illustrated in FIG. 1 includes: pixel array 10, vertical scanning circuit 2, current supply 3, reference signal generator 5, column circuit 30, timing controller 6, and signal processor 7.

Pixel array 10 includes a plurality of pixel circuits 1 arranged in rows and columns. In pixel array 10, a total of N signal lines VL (N is an integer greater than or equal to 3) are arranged for each of the pixel circuit columns. Among the N signal lines, a total of n signal lines (n is an integer less than or equal to N) are non-redundant signal lines for reading out in parallel n pixel signals from n pixel circuits. The remaining N−n signal lines are redundant signal lines to substitute defective signal lines. A total number of redundant signal lines N−n is denoted as a in FIG. 2. It should be noted that the signal lines to substitute defective signal lines can substitute not only for the α signal lines but also for the other n signal lines. When the above-described reading out in parallel of n pixel signals is performed, α ($=N-n$) is an integer greater than or equal to 1, and when the above-described reading out in parallel of n pixel signals is not performed, α ($=N-n$) is an integer greater than or equal to 0. In addition, in the following, a pixel circuit column is sometimes simply referred to as a column.

Each of the plurality of pixel circuits 1 is connected to a group of at least two signal lines out of the N signal lines, and is configured to selectively output a pixel signal to one of the signal lines included in the group.

Vertical scanning circuit 2 controls the exposure and readout operations of pixel array 10. As the control of the readout operation, vertical scanning circuit 2 performs scanning in units of n rows. More specifically, vertical scanning circuit 2 performs scanning in units of n rows such that n pixel circuits 1 aligned in the column direction simultaneously output n pixel signals in parallel to n signal lines VL. In other words, vertical scanning circuit 2 performs the control of reading out simultaneously in parallel pixel signals for n lines.

Here, the description will focus on the n pixel circuits 1 aligned in the column direction among pixel circuits 1 for n rows that correspond to the unit of scanning. As illustrated in FIG. 2, each of the n pixel circuits 1 aligned in the column direction is connected to a group of at least two signal lines VL out of the N signal lines VL, and selectively outputs a pixel signal to one of signal lines VL included in the group. As illustrated in FIG. 2, the circuit section including pixel circuits 1 which belong to one column and column circuit 30 is referred to as relief unit 11. Solid-state imaging device 100 includes relief units 11 of a total number equal to a total number of the columns of pixel circuits 1. It should be noted that relief unit 11 is a circuit section that includes at least (n+a) signal lines in a broad sense.

Current supply 3 is provided for each of the n signal lines. Each current source 3 forms a source follower with an amplification transistor in the pixel circuit that outputs pixel signals, and supplies load current to the amplification transistor.

Reference signal generator 5 outputs a ramp signal for AD conversion to column circuit 30.

Column circuit 30 is provided for each column, and includes a total of n column AD circuits 4 inside. Column circuit 30 is connected to N signal lines VL corresponding to the same column, and converts n analog pixel signals output from n signal lines VL out of a total of N, into digital pixel signals. Column AD circuit 4 is a single-slope AD conversion circuit that compares the ramp signal from reference signal generator 5 with the analog pixel signal, and converts it to a digital value.

Timing controller 6 generates various timing signals to operate the entire solid-state imaging device 100.

Signal processor 7 obtains n digital pixel signals output from each of column circuits 30, and performs signal processing such as offset correction and gain correction.

Figure 3:
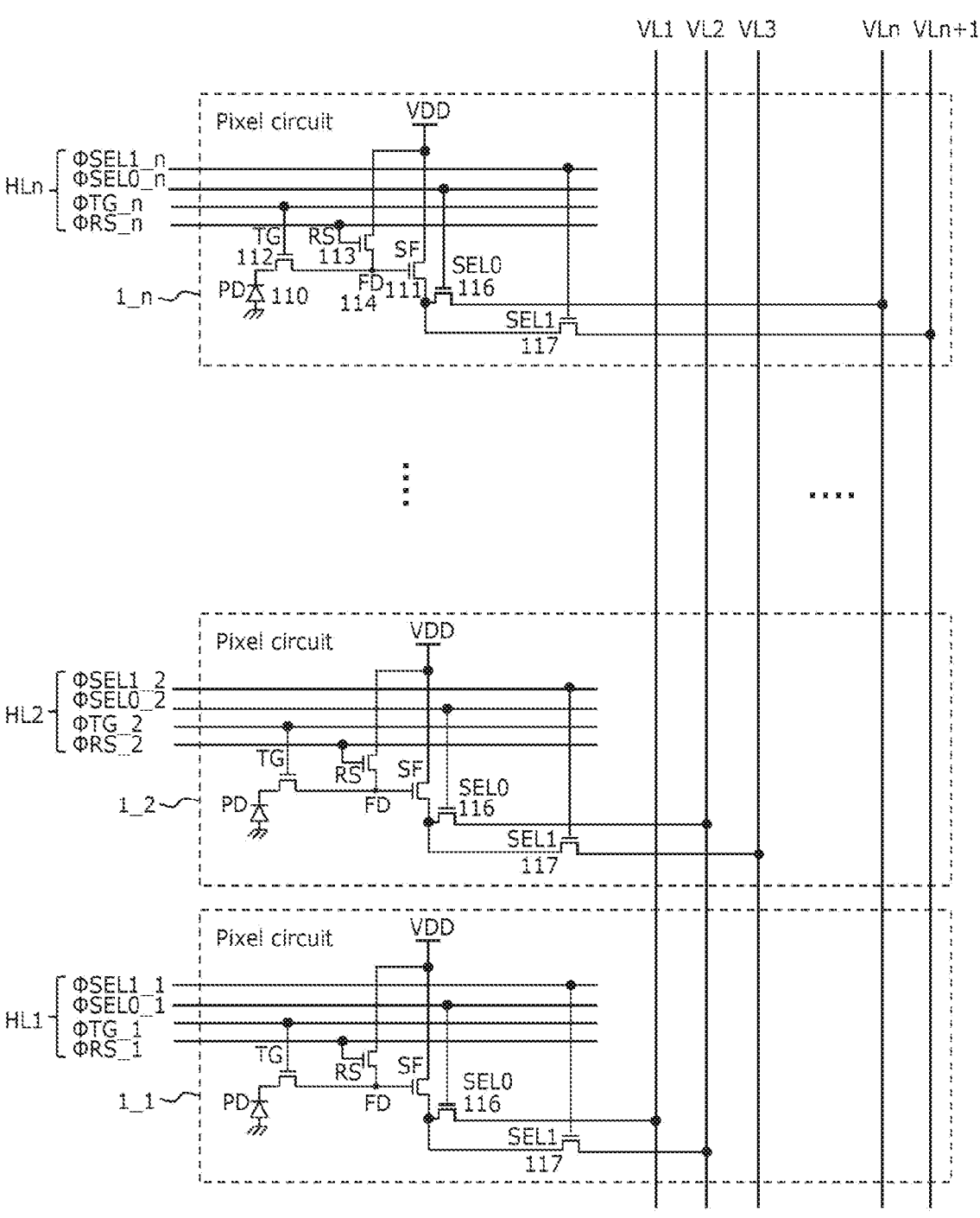
FIG. 3 is a diagram illustrating a circuit example of a pixel circuit and a connection example of the signal lines according to Embodiment 1.

FIG. 3 is a diagram illustrating a circuit example of the pixel circuit and a connection example of the signal lines according to Embodiment 1. In this diagram, n pixel circuits 1 that align in the column direction across n rows are indicated. Here, the n pixel circuits 1 are assumed to be from pixel circuit 1_1 to pixel circuit 1_n.

Pixel circuit 1_i (i is an integer from 1 to n) is connected to the ith to (i+α)th signal lines in arrangement order in the column alignment direction among N (that is, n+α) signal lines, and outputs a pixel signal to any one of the signal lines. It should be noted that α is 1 in FIG. 3. In other words, n signal lines out of the N signal lines are signal lines for parallel readout. Out of the N signal lines, α signal lines are redundant signal lines for use in relieving the defective wiring. Each pixel circuit 1 illustrated in the diagram is connected to two signal lines VL.

Pixel circuit 1 includes: light receiver (pixel, photodiode, photoelectric conversion element) 110; amplification transistor 111 that outputs an amplification signal according to the amount of signal charges; transfer transistor 112 that transfers the signal charge photoelectrically converted by light receiver 110; reset transistor 113; first selection transistor 116; second selection transistor 117; and floating diffusion section (FD section) 114.

First selection transistor 116 and second selection transistor 117 are connected to two signal lines out of the N signal lines.

First selection transistor 116 conducts one of the two signal lines VL and amplification transistor 111 by driving pulse signal SEL 0.

Second selection transistor 117 conducts remaining one of the two signal lines VL and amplification transistor 111 by driving pulse signal SEL 1.

Reset transistor 113 resets FD section 114 to the initial voltage by driving pulse signal RS. Transfer transistor 112 transfers the signals accumulated by light receiver 110 to FD section 114, by driving pulse signal TG. The pixel signal transferred to FD section 114 is output as a voltage to signal line VL via selection transistor 115, by amplifier transistor 111 with the drain side connected to the power supply and current supply 3, and is input to column AD circuit 4. Driving pulse signals SEL, TG, and RS illustrated in FIG. 3 are the details of the signal lines indicated by horizontal control line HL in FIG. 1.

Here, the configuration in which pixel circuit 1 includes a single light receiver 110 has been described, but pixel circuit 1 may include a plurality of light receivers 110.

Each signal line propagates a pixel signal, but it is necessary to wait for a time to drive the load capacitance of the signal line. When the load capacitance is varied, the readout time of pixel signals will be longer due to the need to wait for a time to drive the largest load capacitance. The plurality of signal lines VL 1 to VL n+1 should be equal in load capacitance. The load capacitance of the signal line is determined by the wiring parasitic capacitance between the signal line and the peripheral structure and the load capacitance of the pixel circuit connected to the signal line. When a total number of pixel circuits in the vertical direction of the pixel array is a multiple of n, the total number of pixel circuits connected to the above-described signal lines VL 1 to VL n are each the same. When a total number of pixel circuits in the vertical direction of the pixel array is not a multiple of n, the remainders of the pixel circuits are connected one by one to any of the above-described signal lines VL 1 to VL n+1. The total number of pixel circuits connected to signal lines VL 1 to VL n+1 differs by a maximum of one pixel circuit. However, when the total number of pixel circuits in the vertical direction of the pixel array is sufficiently larger than n, the load capacitance of the pixel circuits connected to signal lines VL 1 to VL n is approximately equal. The load capacitance of the plurality of signal lines VL 1 to VL n+1 is approximately equal, resulting in the fastest readout speed. It is possible to read out n pixel signals in the row direction simultaneously, by including n+α signal lines VL in one pixel circuit column. As a result, compared to a solid-state imaging device provided with a single signal line VL per pixel circuit column, the readout speed is n times faster and the frame rate can be increased. Moreover, since there is no significant change in the load capacitance of each of the signal lines between the case in which a redundant signal line is used to relieve defective wiring and the case in which relief is not carried out, it is possible to inhibit a decrease in readout speed and also inhibit a decrease in frame rate even when the relief is carried out.

The following further describes in detail the circuit example illustrated in FIG. 3. In the circuit example illustrated in FIG. 3, n pixel circuits 1_1 to 1_n are arranged in the same pixel circuit column, constituting pixels for n rows. Pixel circuits 1_1 to 1_n each include a plurality of selection transistors. The gates of first selection transistor 116 and second selection transistor 117 are connected to driving pulse signals SEL 0 and SEL 1, respectively. First selection transistor 116 and second selection transistor 117 are connected to the source side of amplification transistor 111 with the drain side connected to the power supply.

First selection transistor 116 of the above-described pixel circuit 1_1 is connected in such a manner that the above-described amplification transistor 111 and the above-described signal line VL 1 are connected. Second selection transistor 117 is connected in such a manner that the above-described amplification transistor 111 and the above-described signal line VL 2 are connected. First selection transistor 116 of the above-described pixel circuit 1_2 is connected in such a manner that the above-described amplification transistor 111 and the above-described signal line VL 2 are connected. Second selection transistor 117 is connected in such a manner that the above-described amplification transistor 111 and the above-described signal line VL 3 are connected. First selection transistor 116 of the above-described pixel circuit 1_n is connected in such a manner that the above-described amplification transistor 111 and the above-described signal line VL n are connected. Second selection transistor 117 is connected in such a manner that the above-described amplification transistor 111 and the above-described signal line VL n+1 are connected. As described above, each pixel circuit is connected to two signal lines which are numbered consecutively among the above-described signal lines VL 1 to VL n via the above-described two selecting transistors, and the next pixel circuit is connected to the signal lines with the numbers shifted one by one from the previous pixel circuit. This is repeated for n-row pixel circuit cycles, and the pixel circuits are connected to the above-described signal lines VL 1 to VL n+1.

When a total number of pixel circuits in the vertical direction of the pixel array is a multiple of n, the total number of pixel circuits connected to the above-described signal lines VL 2 to VL n each become the same. The total number of pixel circuits connected to the above-described signal lines VL1 and VLn+1 is half the total number of pixel circuits connected to the above-described signal lines VL2 to VL n. When the total number of pixel circuits in the vertical direction of the pixel array is not a multiple of n, the remainders of the pixel circuits are connected one by one to any of the above-described signal lines VL 1 to VL n. The total number of pixel circuits connected to the above-described signal lines VL 2 to VL n+1 differs by a maximum of one pixel circuit. However, when the total number of pixel circuits in the vertical direction of the pixel array is sufficiently larger than n, the load capacitance of the pixel circuits connected to the above-described signal lines VL 2 to VL n is approximately the same. The load capacitance of the pixel circuits connected to the above-described signal lines VL 1 and VL n+1 is reduced by the amount corresponding to the difference in a total number of pixel circuits, but is approximately twice, compared to the above-described signal lines VL 2 to VL n, and there is no significant change in the load of signal lines. Since the load capacitance of the pixel circuit of the above-described signal lines VL 2 to VL n is larger, it is sufficient that the pixel readout time of the above-described signal lines VL 2 to VL n is secured.

Here, the method in which two selection transistors are disposed in each pixel circuit 1 to switch the signal lines has been described, but it is also possible to implement the present disclosure with three or more selection transistors.

Figure 4:
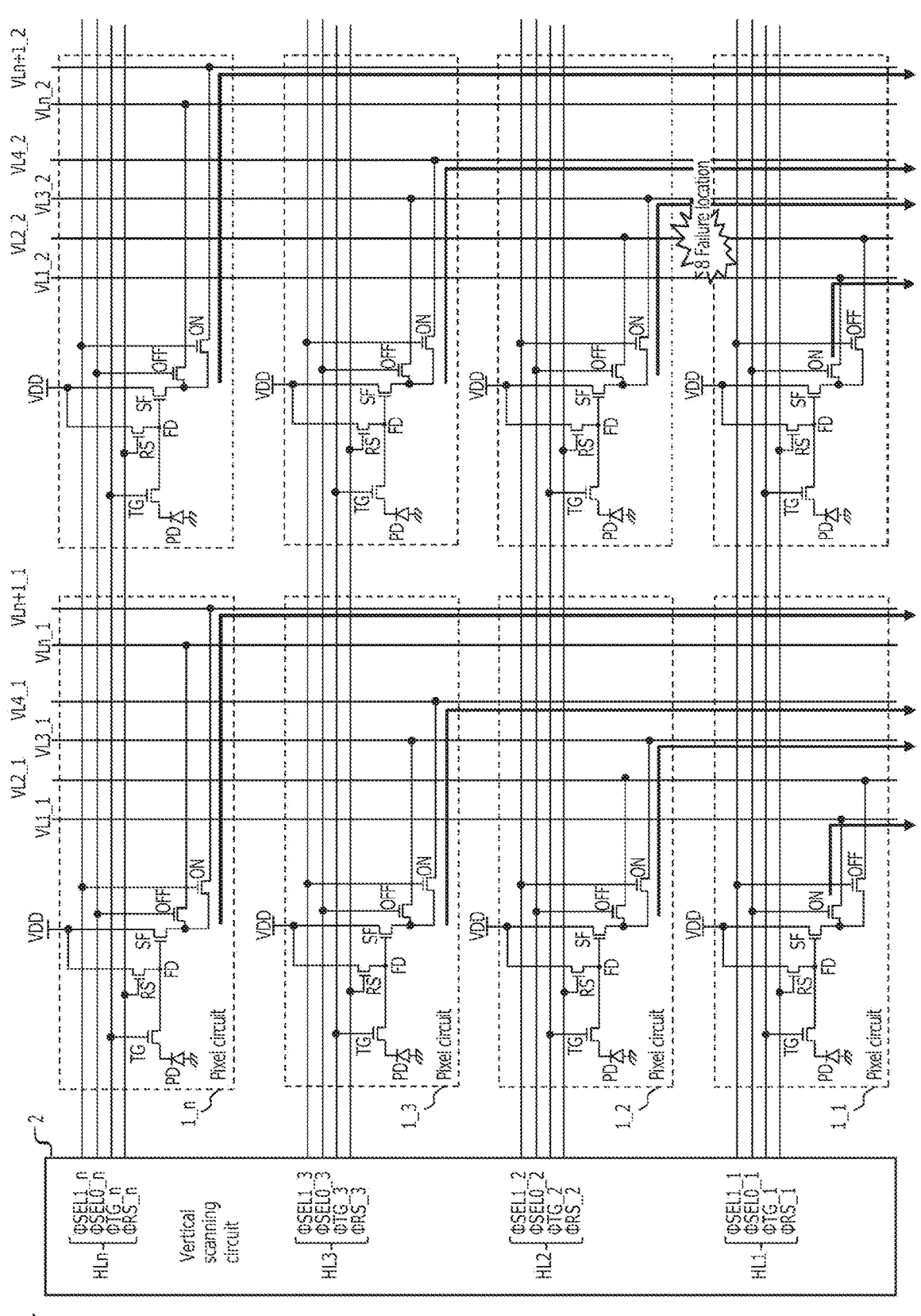
FIG. 4 is an explanatory diagram illustrating an example of relief operation for wiring defect in the solid-state imaging device according to Embodiment 1.

FIG. 4 is an explanatory diagram illustrating an example of relief operation for wiring defect in the solid-state imaging device according to Embodiment 1. The diagram illustrates a relief method when a failure has occurred in pixel signal line VL. FIG. 4 illustrates pixel circuits of n rows and two columns in pixel array 10. The following describes the example in which a failure has occurred at failure location 8 in signal line VL 2_2. In this example, the signal line in which the failure has occurred is the second signal line among the n+1 signal lines.

Each pixel circuit is provided with two selection transistors. Each of the two selection transistors is connected to a corresponding one of the two signal lines which are numbered consecutively. When it is the turn of the row to read out pixel signals, if the signal line numbered smaller out of the two signal lines to which a corresponding pixel circuit is connected is numbered smaller than the signal line in which the failure has occurred, the signal line numbered smaller is selected from among the two signal lines and connected. If the signal line numbered smaller out of the two signal lines to which a corresponding pixel circuit is connected is numbered larger than or equal to the signal line in which the failure has occurred, the signal line numbered larger is selected from among the two signal lines and connected. The signal lines are selected using control pulse SEL of the control signal of vertical scanning circuit 2. In the example of FIG. 4, in pixel circuit 1_1, since the signal line numbered smaller is signal line VL 1, SEL 0_1 becomes Hi (a high level) and SEL1_1 becomes Lo (a low level) to select and connect the signal line which is numbered smaller. In pixel circuits 1_2 to 1_n, the signal lines numbered smaller are signal lines VL 2 to VL n, which are larger than or equal to VL 2 of a failure wiring, and thus SEL 0_2 to n become Lo and SEL 1_2 to n become Hi to select and connect the signal lines numbered larger. In this case, the pixel circuits in n rows are connected to signal lines VL 1 and VL 3 to VL n+1, and signal line VL 2 in which a failure has occurred is not connected to any pixel circuit. Therefore, since pixel signals can be propagated using signal lines without a failure, a line defect does not occur even when a wiring failure has occurred. In addition, since signal line VL 2 in which a failure has occurred is separated by the selection transistor, the redundancy relief operation does not increase the load capacitance of the signal line, and the frame rate is not reduced by the redundancy relief. In addition, it is also possible to support a short failure mode.

Since the signal lines are selected using control pulse SEL of the control signal of vertical scanning circuit 2, the same signal line is selected for the pixel circuit column to which the same control line is connected and which is different from failure location 8, as for the pixel circuit column in which failure location 8 is present. Therefore, in the example illustrated in FIG. 4, the pixel circuit columns in which failure location 8 is not present are also connected to signal lines VL 1 and VL 3 to VL n+1.

Figure 5:
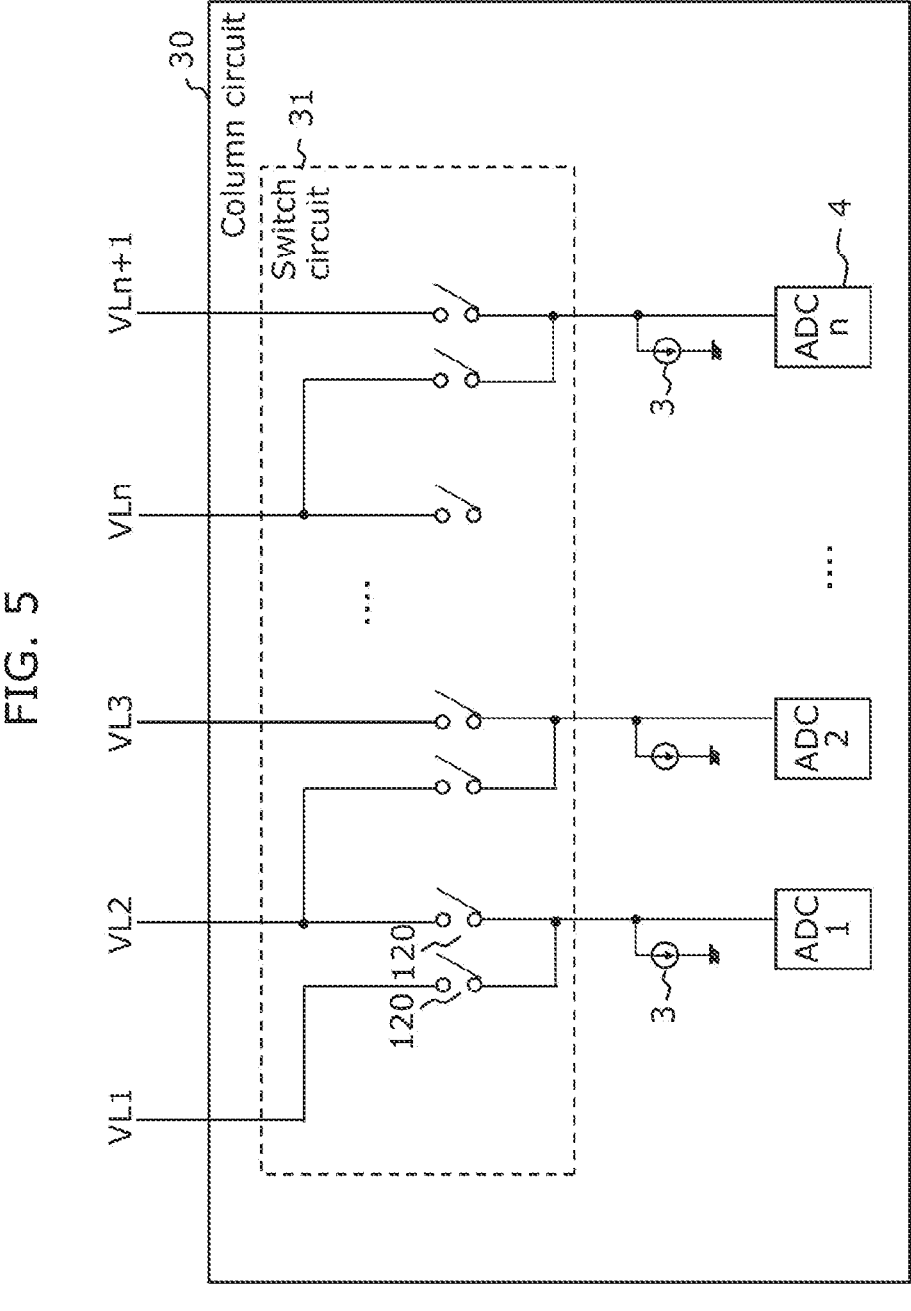
FIG. 5 is a diagram illustrating a configuration example of a column circuit according to Embodiment 1.

FIG. 5 is a diagram illustrating a configuration example of the column circuit according to Embodiment 1. As described in FIG. 3 and FIG. 4, a total of n pixel circuits are connected simultaneously using a total of n signal lines from among n+1 signal lines. As described in FIG. 3, in order to propagate the pixel signal, it is necessary to connect current supply 3 to pixel circuit 1. A method is needed to connect a total of n current supplies to the n signal lines to be used, from among the n+1 signal lines.

Column circuit 30 illustrated in FIG. 5 includes signal lines VL 1 to VL n of one pixel circuit column, n current supplies 3, n column AD circuits 4, and 2n-2 SWs 120 that connect signal lines with current supplies and column AD circuits. Since each current supply 3 and column AD circuit are used in a state in which they are connected one by one, the two are referred to together as column circuit 30. In order to connect the n signal lines to be used with the n column circuits, the first column circuit is connected to signal lines VL 1 and VL 2 via SW 120. The second column circuit is connected to signal lines VL 2 and VL 3 via SW 120. As a result of repeating this, the nth column circuit is configured to be connected to signal lines VL n and VL n+1 via SW 120.

Column circuit 30 that is numbered smaller than the signal line in which a failure has occurred is connected to the signal line on the smaller number side using SW 120, and the signal line on the larger number side is disconnected using SW 120. Column circuit 30 that is numbered same as or larger than the signal line in which a failure has occurred is connected to the signal line on the larger number side using SW 120, and the signal line on the smaller number side is disconnected using SW 120.

In the example described in FIG. 4, in the case where a failure has occurred in the second signal line, the first column circuit is connected to VL 1, and the second and subsequent column circuits are connected to the signal lines on the larger number side, and thus the second to nth column circuits are connected to VL 3 to VL n+1. With this operation, failed signal line VL 2 is disconnected, and signal lines VL 1 and VL 3 to VL n+1 in which no failure has occurred are used.

FIG. 4 and FIG. 5 are examples, and it is possible to implement equivalent advantageous effects with a method of selecting a larger number preferentially. As described above, with the configuration in which one redundant signal line is added to the n signal lines, it is possible to have the function of disconnecting a signal line in which a failure has occurred and connecting a pixel circuit to a signal line in which no failure has occurred. In addition, with the configuration according to Embodiment 1, a total number of signal lines to which a single pixel circuit is connected can be minimized and a total number of pixel circuits connected to each signal line is at most twice as large and not significantly biased, and thus the load capacitance does not change significantly between the signal lines and the difference in pixel readout time is minor.

In the working example of the present disclosure, the explanation has been based on the case where a relief unit including n+α (n>α≤1) signal lines, which includes n signal lines VL and a redundant signal lines, is configured in one pixel circuit column, but the present disclosure can be applied even when a relief unit is configured in a plurality of pixel column units or when there are a plurality of relief units in one pixel column.

Example 1 in which Loads of Signal Lines are Equalized

Figure 6:
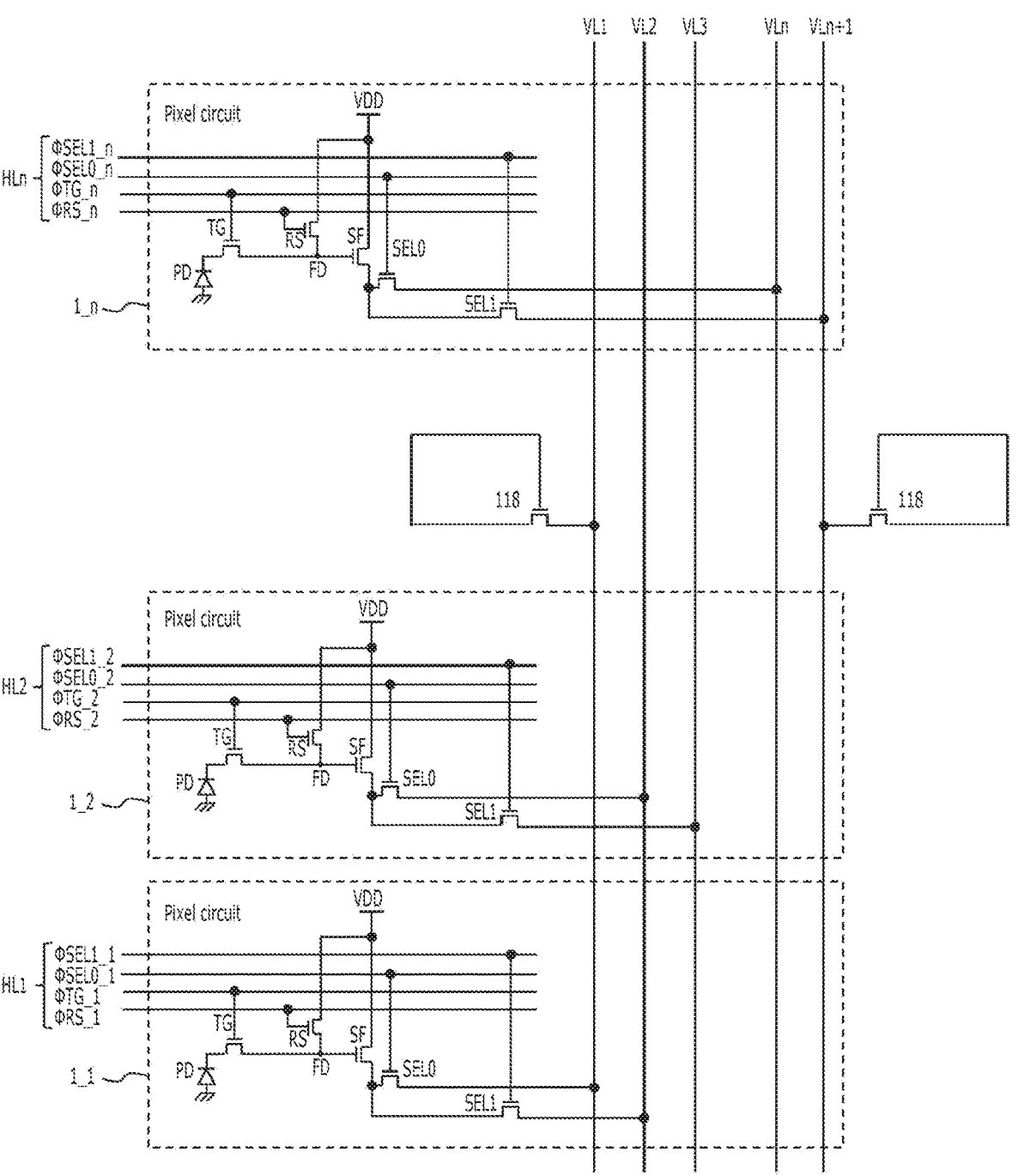
FIG. 6 is a diagram illustrating the main portion of the pixel array with the first example of a load element according to Embodiment 1.

FIG. 6 is a diagram illustrating the main portion of the pixel array with the first example of the load element according to Embodiment 1. The diagram illustrates the example in which the loads of redundant signal lines are equalized by load elements. In the redundancy relief circuit illustrated in FIG. 3, the total number of pixel circuits 1 connected to signal lines VL 1 and VL n+1 is small. For that reason, the load capacitance of the signal lines is smaller than the other signal lines VL 2 to VL n. In view of the above, dummy selection transistor 118 is connected, one per n rows, to signal lines VL 1 and VL n+1 with fewer pixel circuits. According to the above-described configuration, the loads of all signal lines are equalized, and the pixel readout times are equalized. The method of redundancy relief can be implemented in the same manner as that described in FIG. 4.

Example 2 in which Loads of Signal Lines are Equalized

Figure 7:
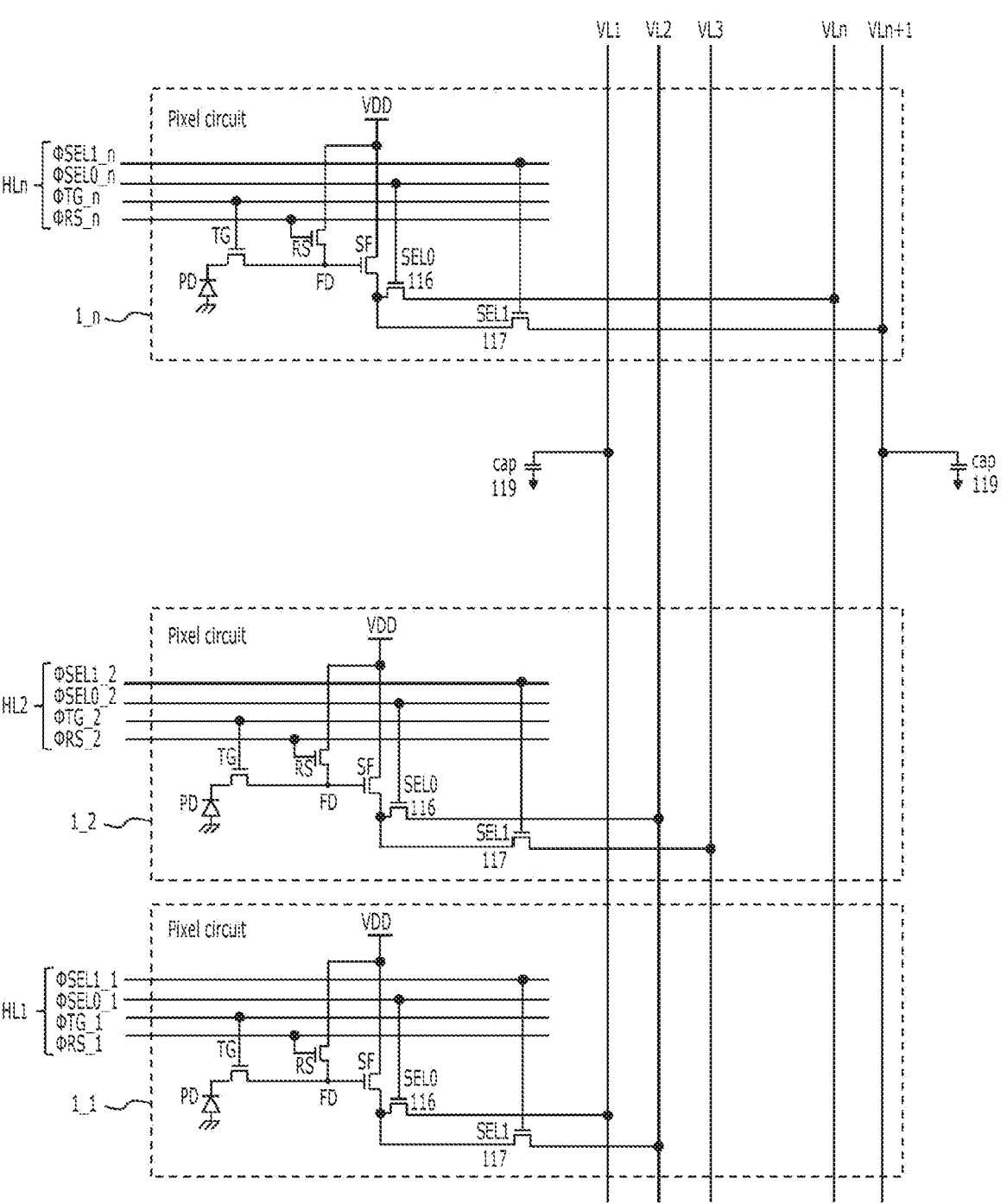
FIG. 7 is a diagram illustrating the main portion of the pixel array with the second example of the load element according to Embodiment 1.

FIG. 7 is a diagram illustrating the main portion of the pixel array with the second example of the load element according to Embodiment 1. The diagram illustrates the example in which the loads of redundant signal lines are equalized by load elements. In the redundancy relief circuit illustrated in FIG. 3, the total number of pixel circuits 1 connected to signal lines VL 1 and VL n+1 is small. For that reason, the load capacitance of the signal lines is smaller than the other signal lines VL 2 to VL n. In view of the above, by providing capacitance 119 such that the wiring parasitic capacitance of VL 1 and VL n+1 of signal lines with fewer pixel circuits is larger than that of other signal lines VL 2 to VL n, the load of all signal lines is equalized and the pixel readout times are equalized. The method of redundancy relief can be implemented in the same manner as that described in FIG. 4.

Example 3 in which Loads of Signal Lines are Equalized

Figure 8:
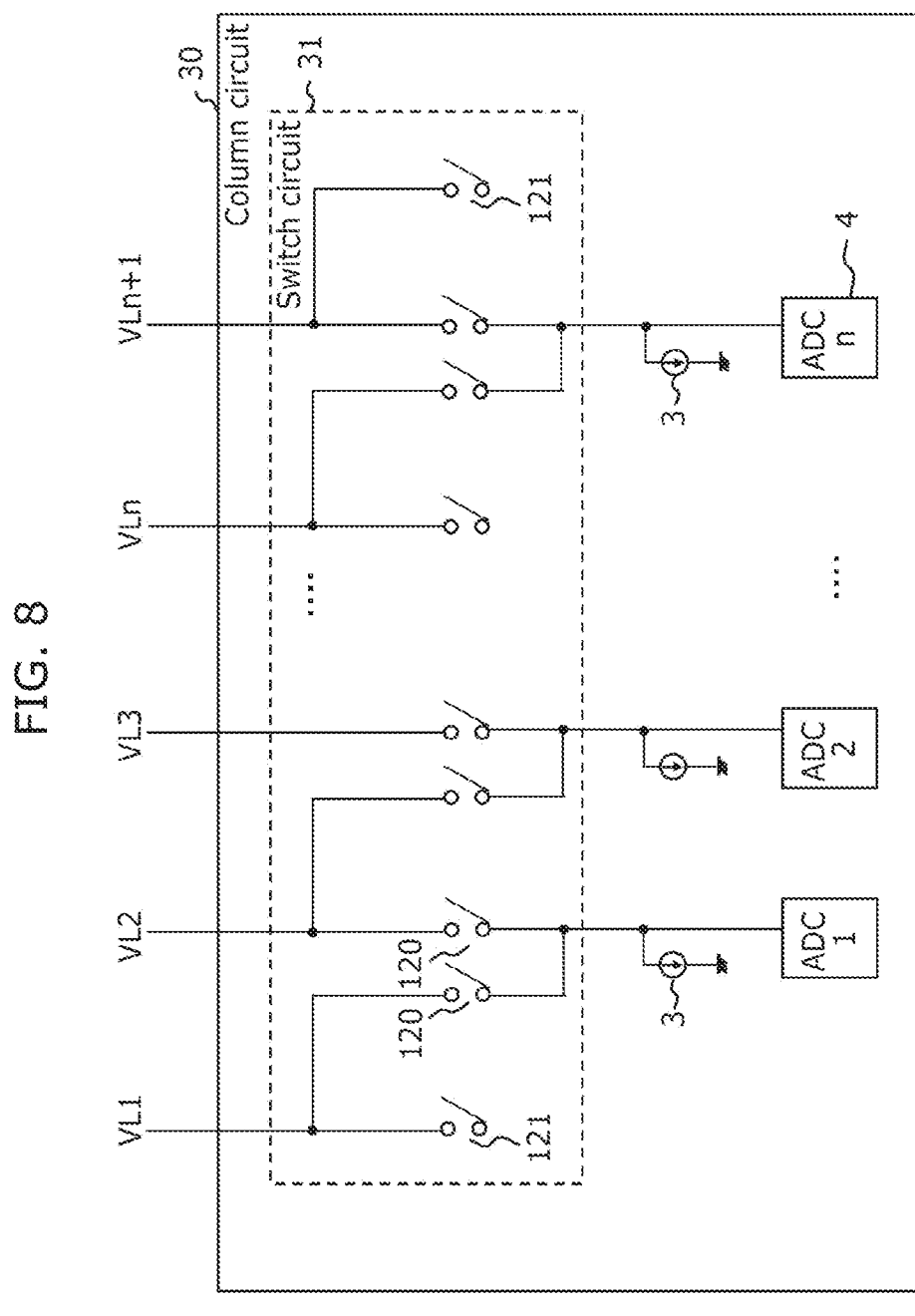
FIG. 8 is a diagram illustrating the main portion of the pixel array with the third example of the load element according to Embodiment 1.

FIG. 8 is a diagram illustrating the main portion of the pixel array with the third example of the load element according to Embodiment 1. The diagram illustrates the example in which the loads of redundant signal lines are equalized by load elements. In the redundancy relief circuit illustrated in FIG. 5, the total number of SWs 120 connected to signal lines VL 1 and VL n+1 is small. For that reason, the load capacitance of the signal lines is smaller than the other signal lines VL 2 to VL n. In view of the above, dummy SW 121 is connected to signal lines VL 1 and VL n+1 with fewer pixel circuits. According to the above-described configuration, the loads of all signal lines are equalized, and the pixel readout times are equalized. The method of redundancy relief can be implemented in the same manner as that described in FIG. 5.

Perform Redundancy Relief for Each Region of the Pixel Array

According to Embodiment 1, a signal line is selected using control pulse SEL of the control signal of vertical scanning circuit 2, and thus the same signal line is selected for the pixel circuit column to which the same control line is connected. Therefore, there is only one failure wiring on which redundancy relief is performed among signal lines VL 1 to VL n in solid-state imaging device 100. When a signal line failure has occurred in more than one location in imaging device 100, relief cannot be performed.

Figure 9:
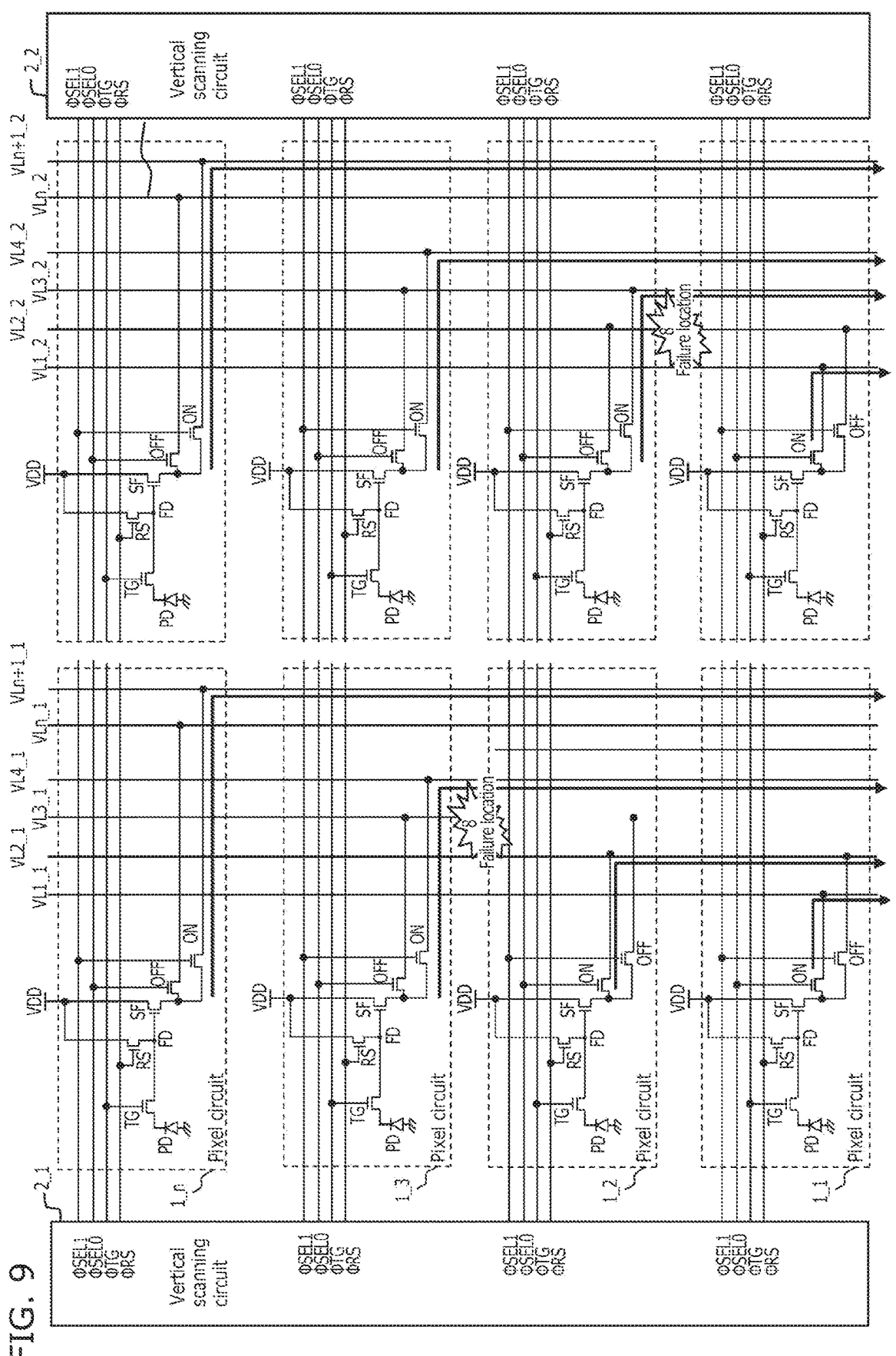
FIG. 9 is an explanatory diagram illustrating an example of relief operation for wiring defect in the solid-state imaging device according to Embodiment 1.

FIG. 9 is an explanatory diagram illustrating an example of relief operation for wiring defect in the solid-state imaging device according to Embodiment 1. The diagram illustrates the connection for performing redundancy relief for each divided region of the pixel array.

For each of the regions of pixel array 10, horizontal control signal HL is divided, and vertical scanning circuit 2 is disposed on each of the divided horizontal control signals HL. The method of redundancy relief can be implemented in the same manner as that described in FIG. 4. It is possible to select the above-described n+1 signal lines by using vertical scanning circuit 2 for each of the regions. For that reason, it is possible to set a failed signal line for each region, and to relieve different signal lines in different regions. As a result, the relief rate of wiring failure is improved.

It should be noted that an example in which pixel array 10 is divided into two regions and two vertical scanning circuits 2 are provided has been illustrated in FIG. 9, but pixel array 10 may be divided into three or more regions. For example, when solid-state imaging device 100 includes two or more stacked semiconductor chips, pixel circuit 1 and vertical scanning circuit 2 can be mounted on separate semiconductor chips. In such a configuration, pixel array may be divided into k regions at boundary lines along the column direction and k vertical scanning circuits 2 may be mounted. For example, k may be 2, 4, 8, etc.

Variation

Figure 10A:
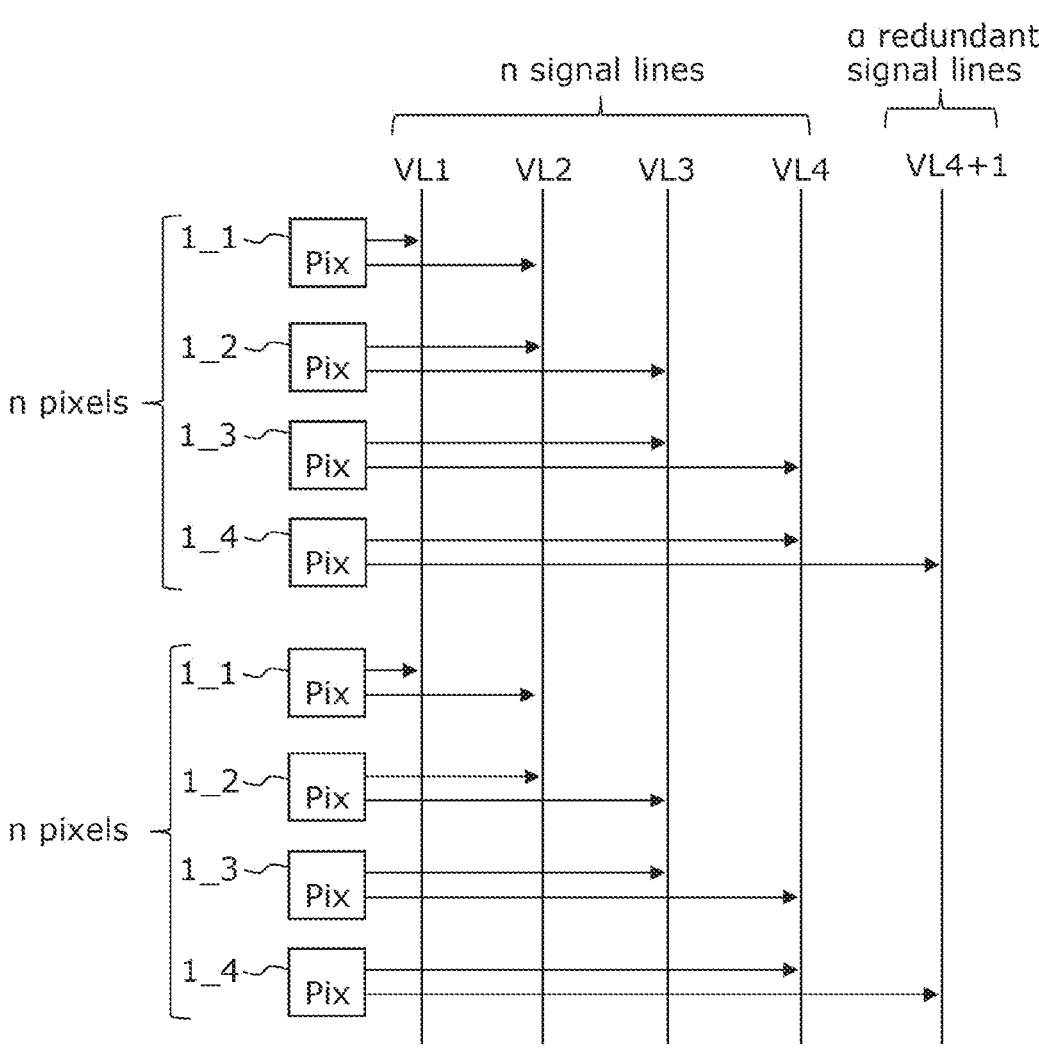
FIG. 10A is a diagram illustrating an example of the connection between n pixel circuits and n+α signal lines ($α=1$) in the solid-state imaging device according to Embodiment 1.
Figure 10B:
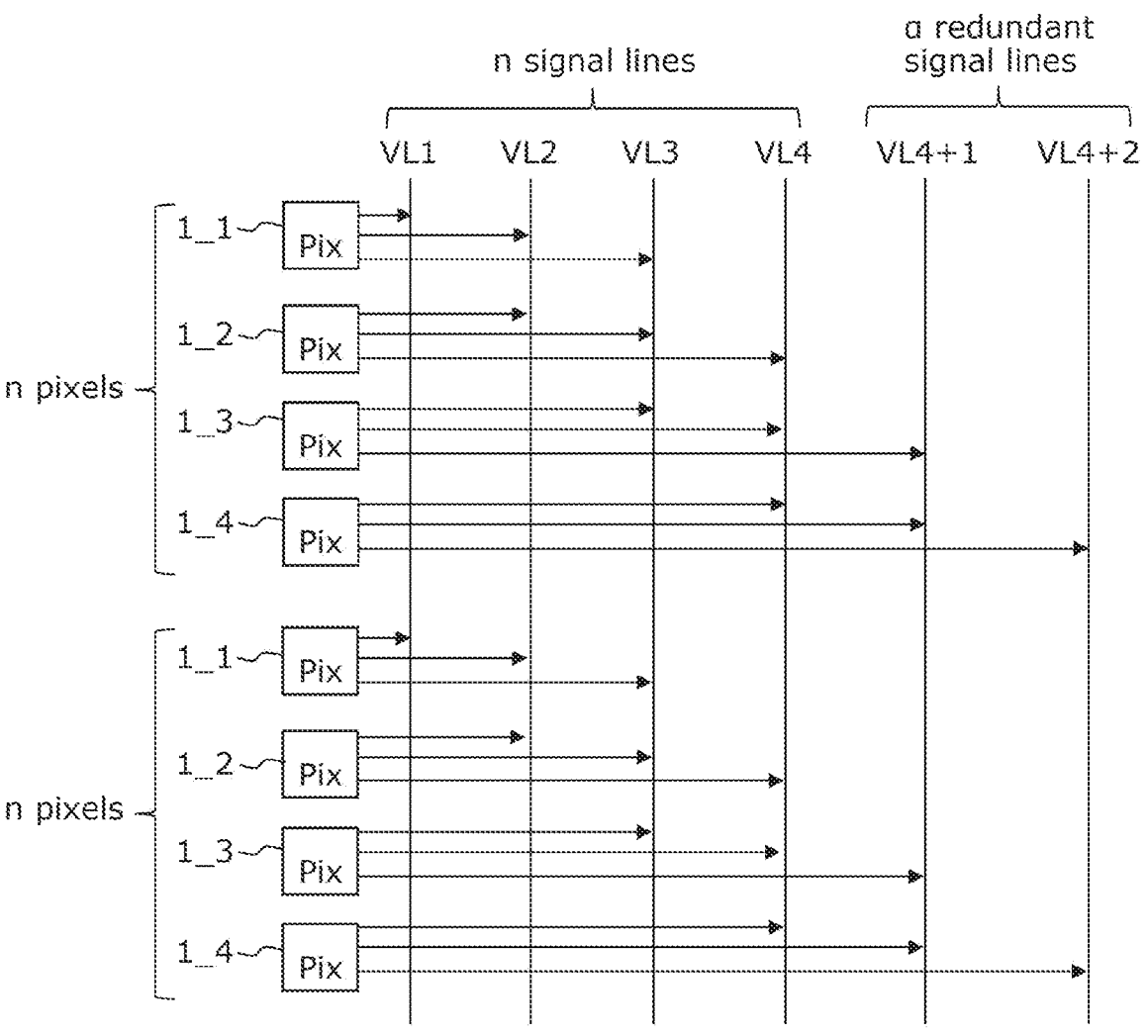
FIG. 10B is a diagram illustrating an example of the connection between n pixel circuits and n+α signal lines ($α=2$) in the solid-state imaging device according to Embodiment 1.

FIG. 10A is a diagram illustrating an example of the connection between n pixel circuits and n+α signal lines (α=1) in the solid-state imaging device according to Embodiment 1. The diagram illustrates an example in which n=4 and α=1.

In this diagram, pixel circuit 1_i (i is an integer from 1 to n) is connected to the ith to (i+α)th signal lines in arrangement order in the column alignment direction among N=5 (=n+a) signal lines, and outputs a pixel signal to any one of the signal lines. FIG. 10A is equivalent to FIG. 3 in this respect, but differs in that the order of the pixel circuits in the column direction is reversed. With this example, the same advantageous effect as FIG. 3 can be yielded.

Next, an example in which two redundant signal lines are provided ($\alpha$=2) will be described.

FIG. 108 is a diagram illustrating an example of the connection between n pixel circuits and n+$\alpha$ signal lines ($\alpha$=2) in the solid-state imaging device according to Embodiment 1.

In this diagram, pixel circuit 1_*i* (i is an integer from 1 to n) is connected to the ith to (i+$\alpha$)th signal lines in arrangement order in the column alignment direction among N=5 (=n+a) signal lines, and outputs a pixel signal to any one of the signal lines. FIG. 108 is also equivalent in this respect. In FIG. 1013, two redundant signal lines are provided, and thus each pixel circuit 1 is connected to three signal lines.

Next, other examples of the connection will be described.

Figure 11:
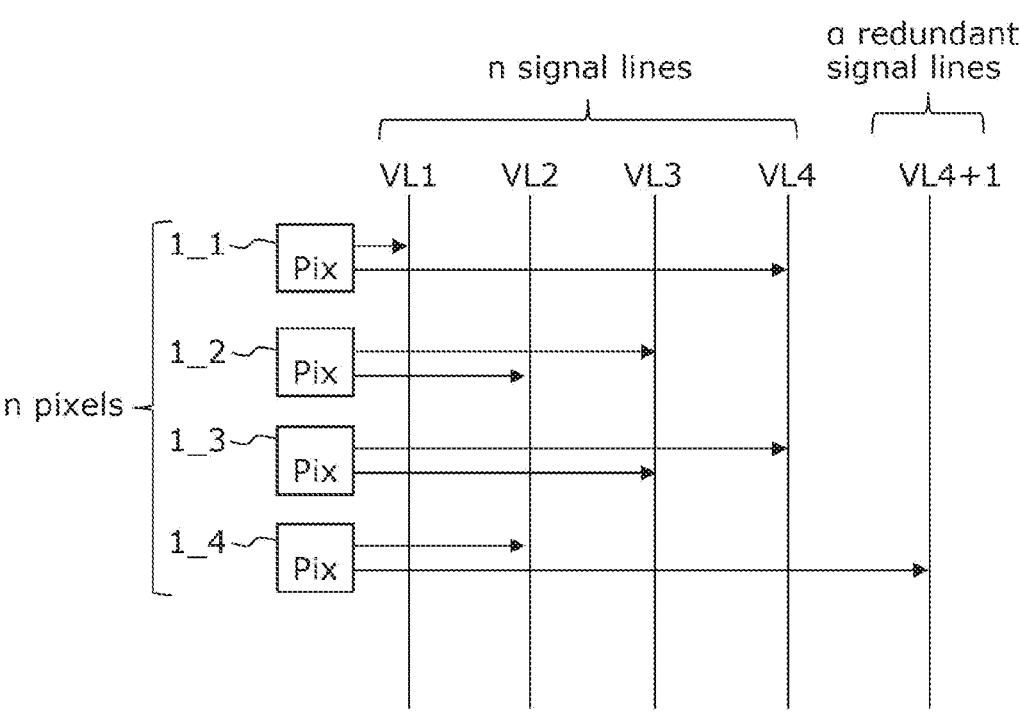
FIG. 11 is a diagram illustrating another example of the connection between n pixel circuits and n+α signal lines ($α=1$) in the solid-state imaging device according to Embodiment 1.

FIG. 11 is a diagram illustrating another example of the connection between n pixel circuits and n+$\alpha$ signal lines ($\alpha$=1) in the solid-state imaging device according to Embodiment 1. In FIG. 11, n=4.

Each of the n (n is an integer less than or equal to N) pixel circuits 1 aligned in the column direction is connected to a group of at least two signal lines out of N signal lines, and selectively outputs a pixel signal to one of the signal lines included in the group. The n groups corresponding to the n pixel circuits 1 have mutually different combinations of signal lines. The example illustrated in FIG. 11 does not have such a simple regularity as the examples illustrated in FIG. 3, FIG. 10A, and FIG. 108. This configuration also yields the same advantageous effect as in FIG. 3, etc.

Next, an example in which $\alpha$=0, i.e., a redundant signal line is not provided will be described.

Figure 12:
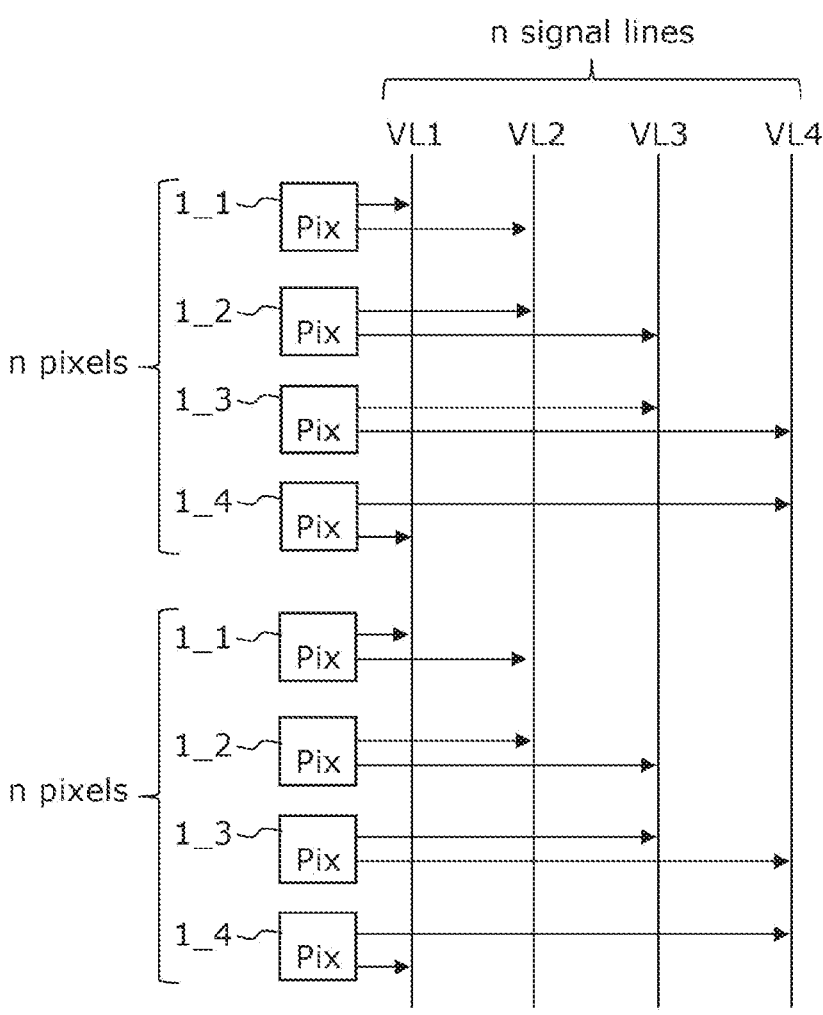
FIG. 12 is a diagram illustrating an example of the connection between n pixel circuits and n+α signal lines ($α=0$) in the solid-state imaging device according to Embodiment 1.

FIG. 12 is a diagram illustrating an example of the connection between n pixel circuits and n+$\alpha$ signal lines ($\alpha$=0) in the solid-state imaging device according to Embodiment 1. In the example illustrated in FIG. 12, N=n=4.

In FIG. 12, as in FIG. 11, the following requirements are satisfied. Each of the n (n is an integer less than or equal to N) pixel circuits 1 aligned in the column direction is connected to a group of at least two signal lines out of N signal lines, and selectively outputs a pixel signal to one of the signal lines included in the group. The n groups corresponding to the n pixel circuits 1 have mutually different combinations of signal lines. However, since no redundant wiring line is provided in FIG. 12, it is necessary to read out pixel signals by any of the signal lines in place of the defective wiring, and moreover, the pixel signal of the corresponding pixel circuit also needs to be read out. In other words, it is possible to relieve a defective signal line by performing the readout operation twice in a time-division manner. For example, when signal line VL 1 becomes a defective wiring, the pixel signals of pixel circuit 1_2 to pixel circuit 1_4 are read out through signal line VL 2 to signal line VL 3 in the first readout operation, and the pixel signals of pixel circuit 1_1 are read out through signal line VL 2 in the second readout operation. In the second readout operation, signal line VL 2 is used in place of signal line VL 1. In FIG. 12, although it is difficult to control the decrease in the frame rate when a defective signal line is relieved, it is possible to perform relief on the defective signal line.

As described above, solid-state imaging device 100 according to Embodiment 1 includes a plurality of pixel circuits arranged in rows and columns; and a relief unit. In the solid-state imaging device: the relief unit includes N signal lines and n pixel circuits among the plurality of pixel circuits, N being an integer greater than or equal to 3, n being an integer less than or equal to N; each of the n pixel circuits is connected to a group of at least two signal lines out of the N signal lines, and selectively outputs a pixel signal to one of the at least two signal lines included in the group; and n groups corresponding to the n pixel circuits have mutually different combinations of signal lines, the n groups each being the group.

According to the above-described configuration, (N−n) redundant signal lines are added for each n signal lines, and thus it is possible to perform the relief in both of the case where an open defect has occurred and the case where a short defect has occurred, in the (N−n) signal lines out of the n signal lines. Moreover, since the wiring capacitance of the signal lines, i.e., the load capacitance to the pixel circuit, does not change significantly between the case where relief is performed and the case where relief is not performed, it is not necessary to decrease the readout speed, and thus it is possible to inhibit a decrease in the frame rate in the case where relief is performed. For example, by disconnecting a failed signal line and connecting the pixel circuit to a signal line in which there is no failure, the wiring load of the failed signal line is disconnected and the wiring load of the signal line does not increase during redundancy relief. As a result, the readout speed does not decrease and the frame rate can be maintained. In addition, since the failed signal line is disconnected, the above-described configuration can also be used for the relief in a short failure mode. Moreover, since the redundant circuit includes a redundant signal lines ($\alpha$≥0) for n signal lines, the area influence is small and the increase in failure rate due to the added redundant signal lines is minor.

Here, the plurality of pixel circuits 1 may each include: an amplification transistor that outputs a pixel signal; and selection transistors of a total number equal to a total number of the at least two signal lines included in a corresponding one of the n groups, and the selection transistors may each connect an output terminal of the amplification transistor and one of the at least two signal lines included in the corresponding one of the n groups.

According to the above-described configuration, it is possible to easily implement selectively conducting the selective transistor.

Here, the N signal lines may include n signal lines of a total number equal to a total number of n pixel signals and a redundant signal lines, a being an integer greater than or equal to 1, and each of the plurality of pixel circuits may be connected to at least (1+$\alpha$) signal lines.

According to the above-described configuration, for example, when the total number of redundant signal lines $\alpha$ (=N−n) is 1, one defect in n signal lines can be relieved, and when $\alpha$ (=N−n) is 2, two defects in n signal lines can be relieved.

Here, an ith group included in the n groups may include, among the N signal lines, ith to (i+$\alpha$)th signal lines in arrangement order in a column alignment direction, i being an integer from 1 to n.

According to the above-described configuration, n groups to which n pixel circuits are connected are arranged such that the signal lines are shifted one by one in the column alignment direction. The n pixel circuits and (n+a) signal lines are regularly and periodically connected for each n pixel circuits in the column direction, and thus it is possible to facilitate layout and relief control in the event of defects.

Here, the n pixel circuits may output pixel signals in parallel, n being an integer less than N.

With this, since n pixel signals (i.e., n rows) are output in parallel, the above-described configuration is suitable for increasing the number of pixels and accelerating the frame rate.

Here, the N signal lines may include no redundant signal line, and the n pixel circuits may include at least one pixel circuit which outputs a pixel signal in a time-division manner from a signal line which is also connected to an other pixel circuit.

According to the above-described configuration, although it is difficult to inhibit a decrease in frame rate when relieving a defective signal line, it is possible to relieve the defective signal line without providing a redundant signal line.

Here, a plurality of scanning circuits corresponding to a plurality of regions into which the plurality of pixel circuits are divided may be included, and the plurality of scanning circuits may independently control selection of a signal line to which a pixel signal is to be output.

According to the above-described configuration, it is possible to increase a total number of unnecessary signal lines which can be used for relief, and thus it is possible to further improve yield.

Here, a load element in at least two signal lines among the N signal lines may be included, the load element being for adjusting a magnitude of a load.

According to the above-described configuration, the read-out speed of the N signal lines can be equalized, and thus it is possible to inhibit a decrease in the frame rate.

Here, an imaging apparatus includes: the above-described solid-state imaging device which captures an image of an object; an imaging optical system that guides an incident light from the object to the solid-state imaging device; and a signal processor that processes an output signal from the solid-state imaging device.

According to the above-described configuration, (N−n) redundant signal lines are added for each n signal lines, and thus it is possible to perform the relief in both of the case where an open defect has occurred and the case where a short defect has occurred, in the (N−n) signal lines out of the n signal lines. Moreover, since the wiring capacitance of the signal lines, i.e., the load capacitance to the pixel circuit, does not change significantly between the case where relief is performed and the case where relief is not performed, it is not necessary to decrease the readout speed, and thus it is possible to inhibit a decrease in frame rate in the case where relief is performed.

Embodiment 2

In the present embodiment, an example of the configuration in which N signal lines VL and column circuits 30 are divided into groups that can operate independently.

FIG. 13 is a diagram illustrating an example of the configuration of a pixel array and column circuits in a solid-state imaging device according to Embodiment 2. In the circuit illustrated in FIG. 13, α=1 and one redundant signal line is provided.

In solid-state imaging device 100, a layout in which column circuits 30 (current supplies 3 and column AD circuits 4) are divided and arranged is sometimes adopted instead of being arranged just on one side of pixel array 10. This is because this arrangement is easy to layout without characteristic degradation when α total number of column circuits that can be mounted in one pixel circuit column is increased. Since the frame rate can be improved by increasing the total number of column circuits, this layout has good compatibility with the technique of solid-state imaging device 100 which includes a plurality of signal lines in one pixel circuit column as described in FIG. 4 which is the basic configuration of the present disclosure.

In Embodiment 2, n+1 signal lines VL and n column circuits 30 are provided in one pixel circuit column. Column circuits 30 are divided into two regions to be laid out by n/2 for each of the two regions. Column circuits 30 as divided each include, among n+1 signal lines, n/2 signal lines that are connected to only the column circuit on one side and one signal line that is connected to the both of the column circuits. In the initial state, pixel signals are transmitted from pixel circuit 1 to the column circuit using n/2 signal lines that are connected to only the column circuits on one side. The one signal line connected to the both of the column circuits is a redundant wiring line.

Figure 14:
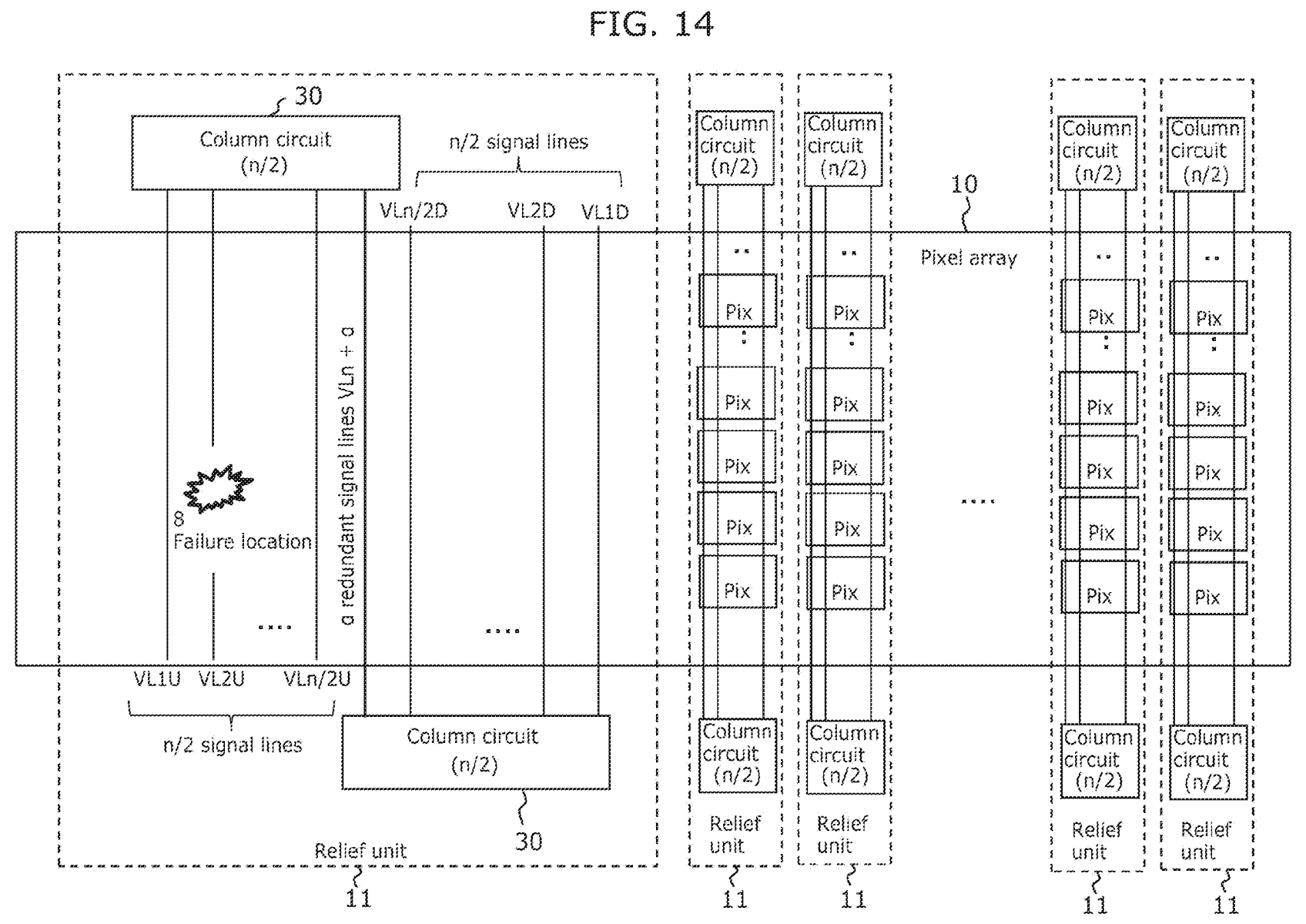

FIG. 14 is an explanatory diagram illustrating an example of a relief operation for wiring defect in the solid-state imaging device according to Embodiment 2. FIG. 14 illustrates pixel circuits of one pixel circuit column of the above-described pixel array 10. The following describes the example in which a failure has occurred at failure location 8 in signal line VL 2U. In this example, the signal line in which a failure has occurred is the second signal line among the signal lines connected to column circuits 30 on the upper side out of the n+1 signal lines.

In Embodiment 2, redundancy relief is performed by shifting signal lines only within the group including the column circuit to which the failed signal line is connected among the n+1 signal lines. More specifically, each pixel circuit is provided with two selection transistors. Each of the two selection transistors is connected to a corresponding one of the two signal lines which are numbered consecutively. When it is the turn or the row to read out pixel signals, in the group including the column circuit to which the signal line in which a failure has occurred is connected, if the signal line numbered smaller out of the two signal lines to which a corresponding pixel circuit is connected is numbered smaller than the signal line in which the failure has occurred, the signal line numbered smaller is selected from among the two signal lines and connected. If the signal line numbered smaller out of the two signal lines to which a corresponding pixel circuit is connected is numbered larger than or equal to the signal line in which the failure has occurred, the signal line numbered larger is selected from among the two signal lines and connected. The signal lines are selected using control pulse SEL of the control signal of vertical scanning circuit 2. In the example illustrated in FIG. 14, each pixel circuit is connected to signal lines VL 1U, VL 3U to VL n/2U, and VL n+1, and the failed signal line VL 2U is not connected to any of the pixel circuits. Therefore, since pixel signals can be propagated using signal lines without a failure, a line defect does not occur even when α wiring failure has occurred. In addition, since signal line VL U2 in which a failure has occurred is separated by the selection transistor, the redundancy relief operation does not increase the load capacitance of the signal line, and the frame rate is not reduced by the redundancy relief. The signal lines are not shifted in a group including a column circuit to which the signal line in which a failure has occurred is not connected. In the example illustrated in FIG. 14, each pixel circuit is connected to signal lines VL 1D to VL n/2D. Since there is no failure in these signal lines, it is possible to propagate pixel signals.

The above-described case is just one example. Even when column circuits 30 are divided into three or more regions and laid out, the signal lines connected to column circuits 30 are divided for each group and connected to the column circuit in the same manner, and when α failure has occurred in a signal line, it is possible to perform redundancy relief by shifting only the signal lines of the group in which a failure has occurred. As a result, it is possible to reduce a total number of signal lines used for redundancy relief that are connected to a plurality of column circuits, which has the advantage of high layout efficiency.

Example in which Loads of Redundant Signal Lines are Equalized According to Embodiment 2

Figure 15:
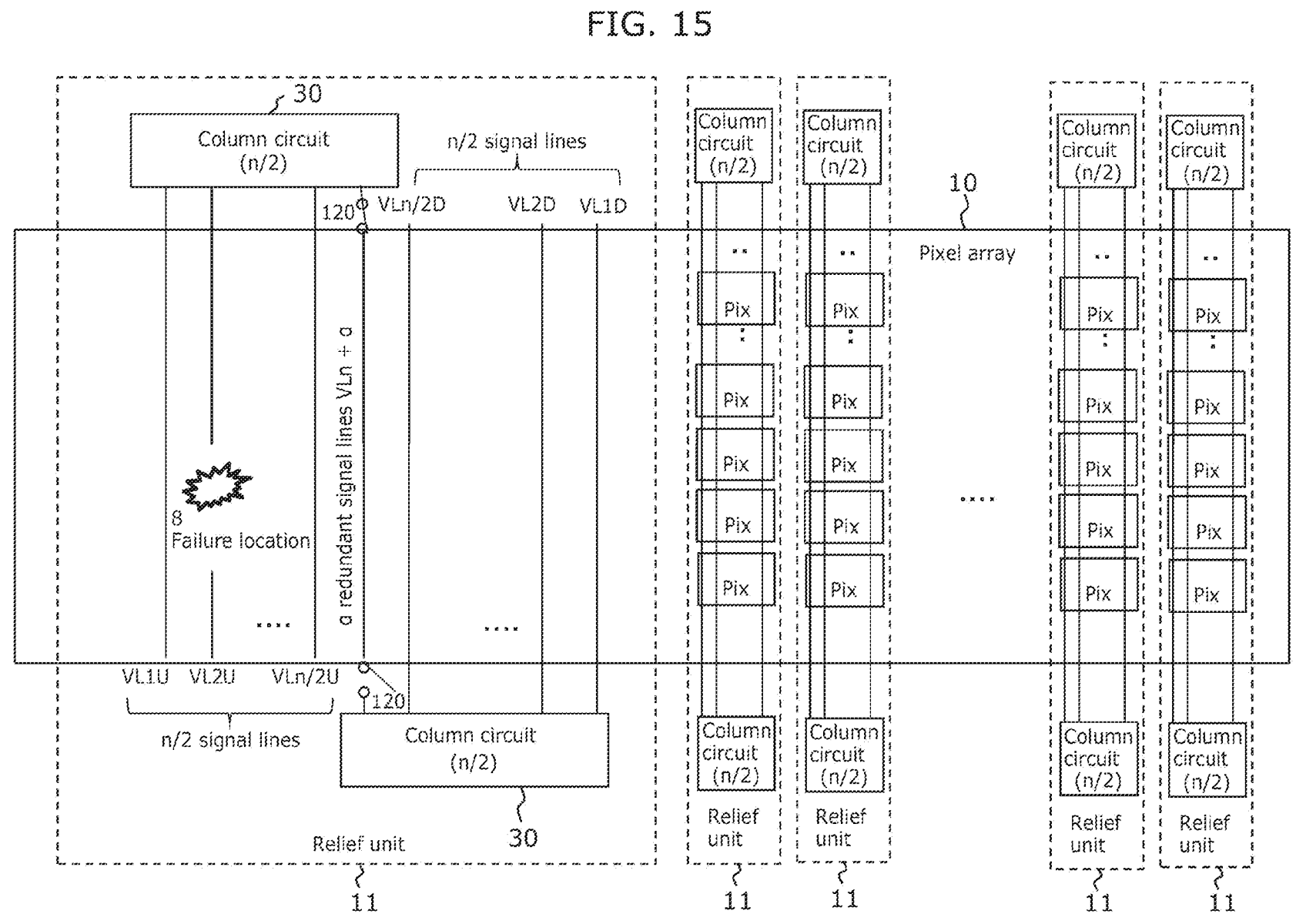

FIG. 15 is a diagram illustrating a variation of the pixel array and the column circuits in the solid-state imaging device according to Embodiment 2. The diagram illustrates an example in which loads of redundant signal lines are equalized.

As described above with reference to FIG. 13, the signal lines connected to the two divided column circuits are divided into two groups and connected to each column circuit, but signal line VL n+1 that is used for redundancy relief needs to be connected to both of the column circuits, and thus the wiring length of only this signal line becomes longer. Therefore, the load of signal line increases in only this signal line VL n+1.

As illustrated in FIG. 15, SW 120 is provided which selectively connects the above-described signal line VL n+1 that is used for redundancy relief and the column circuit. By turning ON only SW 120 on the side to be connected to column circuit 30 for redundancy relief operation and turning OFF SW 120 on the side not to be connected, the wiring capacitance of signal line VL n+1 for connection to both column circuits 30 is reduced to be close to the load capacitance with the other signal lines. In this manner, the loads of all signal lines are equalized, and the pixel readout times are equalized.

Overall Configuration of Redundancy Relief

Figure 16:
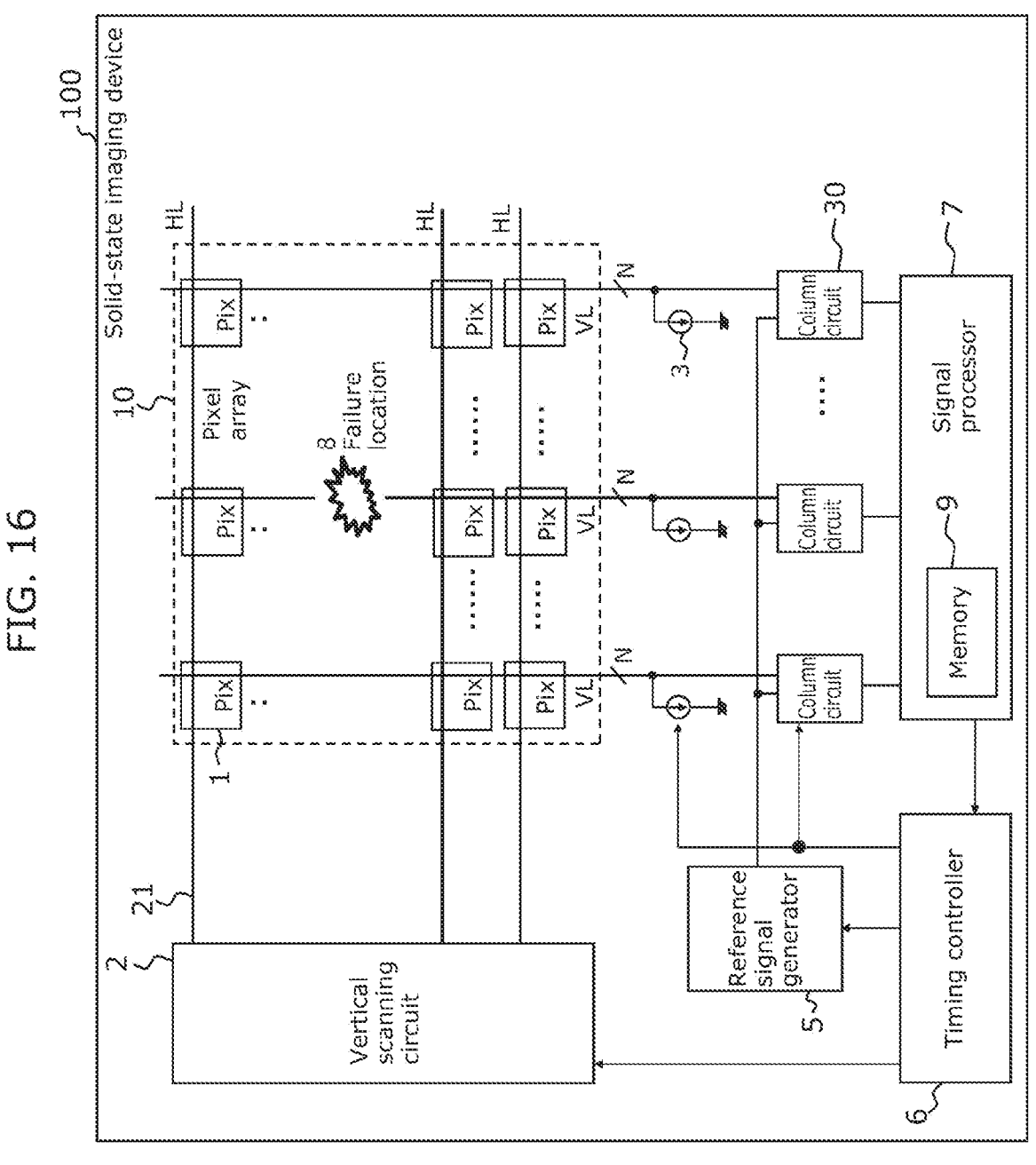
FIG. 16 is a diagram illustrating another example of the configuration of the solid-state imaging device according to Embodiment 1 and Embodiment 2.

FIG. 16 is a diagram illustrating another example of the configuration of the solid-state imaging device according to Embodiment 1 and Embodiment 2.

The solid-state imaging device illustrated in FIG. 16 is provided with memory 9 in the signal processor in addition to the basic configuration example of the solid-state imaging device illustrated in FIG. 1.

In memory 9, the locations of wiring defects detected in the pre-shipment inspection of solid-state imaging device 100 and recovery information to relieve the wiring defects are stored. Specifically, as the recovery information, information about to which current supply 3 or column AD circuit 4 signal line VL should be connected, and information about which signal line VL should be selected by vertical scanning circuit 2, according to the location of wiring defects, are stored. Based on the information stored in memory 9, timing controller 6 controls vertical scanning circuit 2, current supply 3, or column AD circuit 4.

Memory 9 is a non-volatile memory, and by performing writing at the time of pre-shipment inspection, data stored in memory 9 is read when the image sensor is powered on, and the sensor is activated in a redundancy relief state of wiring.

Figure 17:
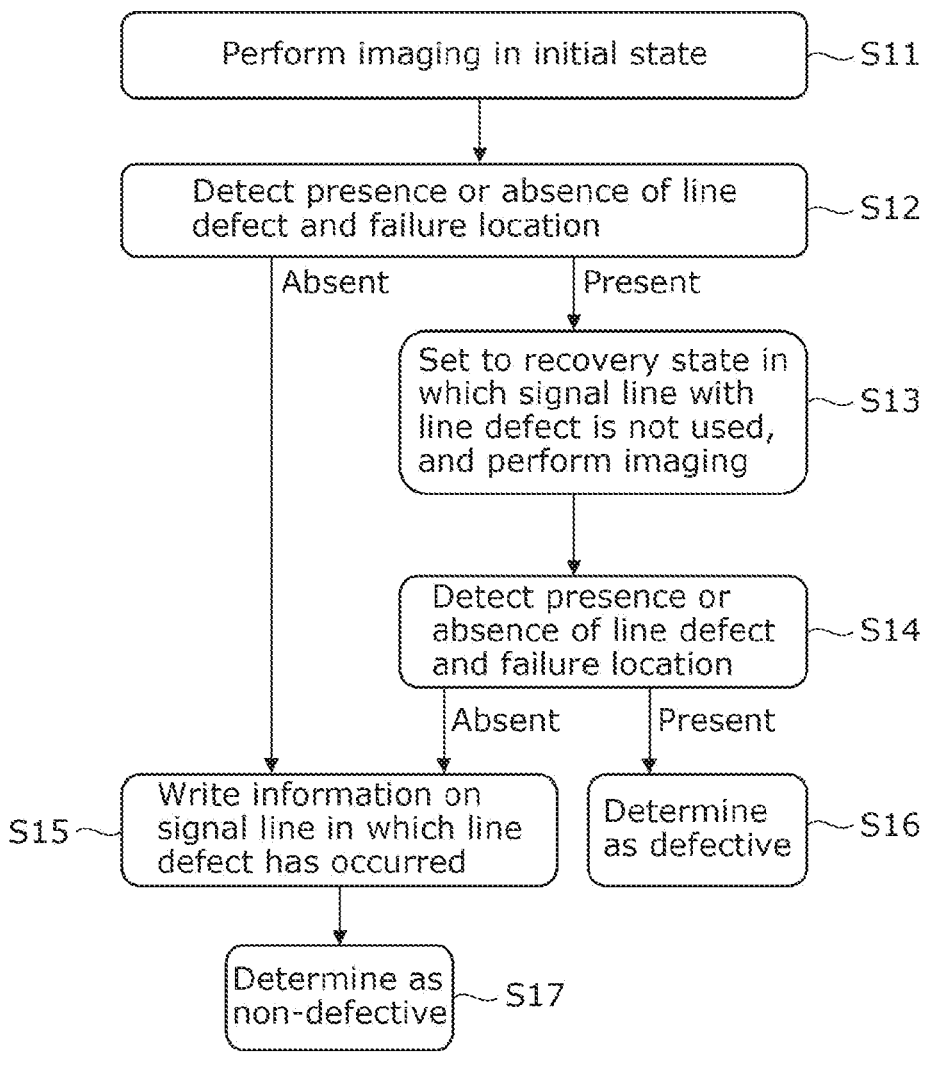
FIG. 17 is a flowchart illustrating the processes of writing recovery information to the solid-state imaging device according to Embodiment 2.

FIG. 17 is a flowchart illustrating the processes of writing recovery information to the solid-state imaging device according to Embodiment 2.

The flowchart indicates recording recovery information onto memory 9. This processing is carried out only once, for example, at the time of pre-shipment inspection of solid-state imaging device 100.

In Step 11, an imaging inspection is performed in the initial state with no recovery information.

Imaging data is processed to detect, in Step 12, the presence or absence of a line defect, and when α line defect is present, a failure location is detected. Here, when α line defect is not present, the processing proceeds to Step 15.

When a line defect is present, in Step 13, the signal line in which the line defect has occurred is set to the recovery state in which the signal line is not used, and imaging is performed.

In Step 14, the imaging data is processed to detect the presence or absence of a line defect. Here, when α line defect is present, solid-state imaging device 100 is determined as defective in Step 16. When a line defect is not present, the processing proceeds to Step 15.

In Step 15, information on the signal line in which a line defect has occurred is written onto memory 9.

Solid-state imaging device 100 is determined as non-defective in Step 17.

Figure 18:
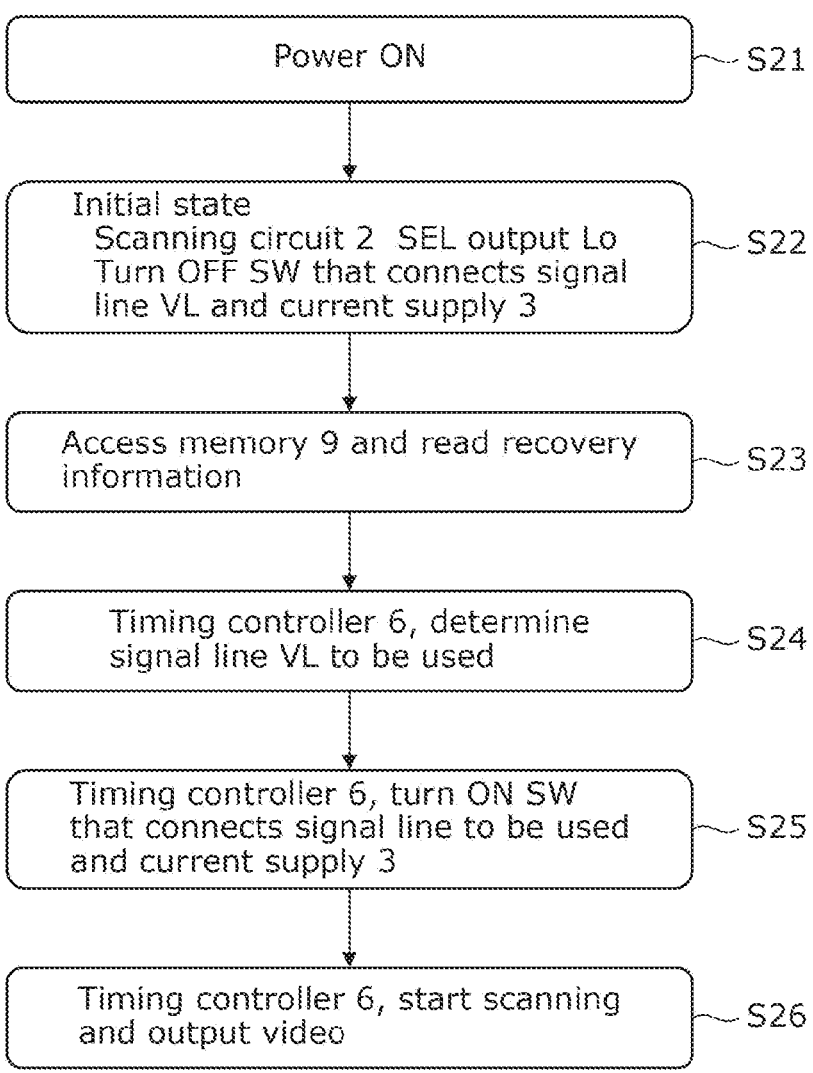
FIG. 18 is a flowchart illustrating the imaging processes of imaging using recovery information in the solid-state imaging device according to Embodiment 2.

FIG. 18 is a flowchart illustrating the imaging processes of imaging using recovery information in the solid-state imaging device according to Embodiment 2.

The flowchart indicates the imaging processing in which imaging is performed using the recovery information stored in memory 9. This processing is carried out, for example, when solid-state imaging device 100 is powered on.

In Step 21, solid-state imaging device 100 is powered on.

In Step 22, in the initial state of signal line VL immediately after power-on, the horizontal control lines of the selection transistors of all rows are fixed to Lo by vertical scanning circuit 2. In addition, all SWs 120 that connect signal lines VL, current supplies 3, and column AD circuits 4 are turned OFF. This is to disconnect all paths for current flow, because when α failure has occurred in signal line VL, there is a possibility that an anomaly current flows.

In Step 23, memory 9 is accessed, the recovery information is read, and signal line VL to be used is determined.

In Step 24, timing controller 6 outputs a signal to select signal line VL to be used.

In Step 25, timing controller 6 turns ON SW that connects signal line VL and current supply 3.

In Step 26, timing controller 6 starts scanning and a video is output. Activation in this step prevents signal line VL in which a failure has occurred from being connected to the peripheral circuits after power-on, and an anomaly current from flowing.

Camera System

Figure 19:
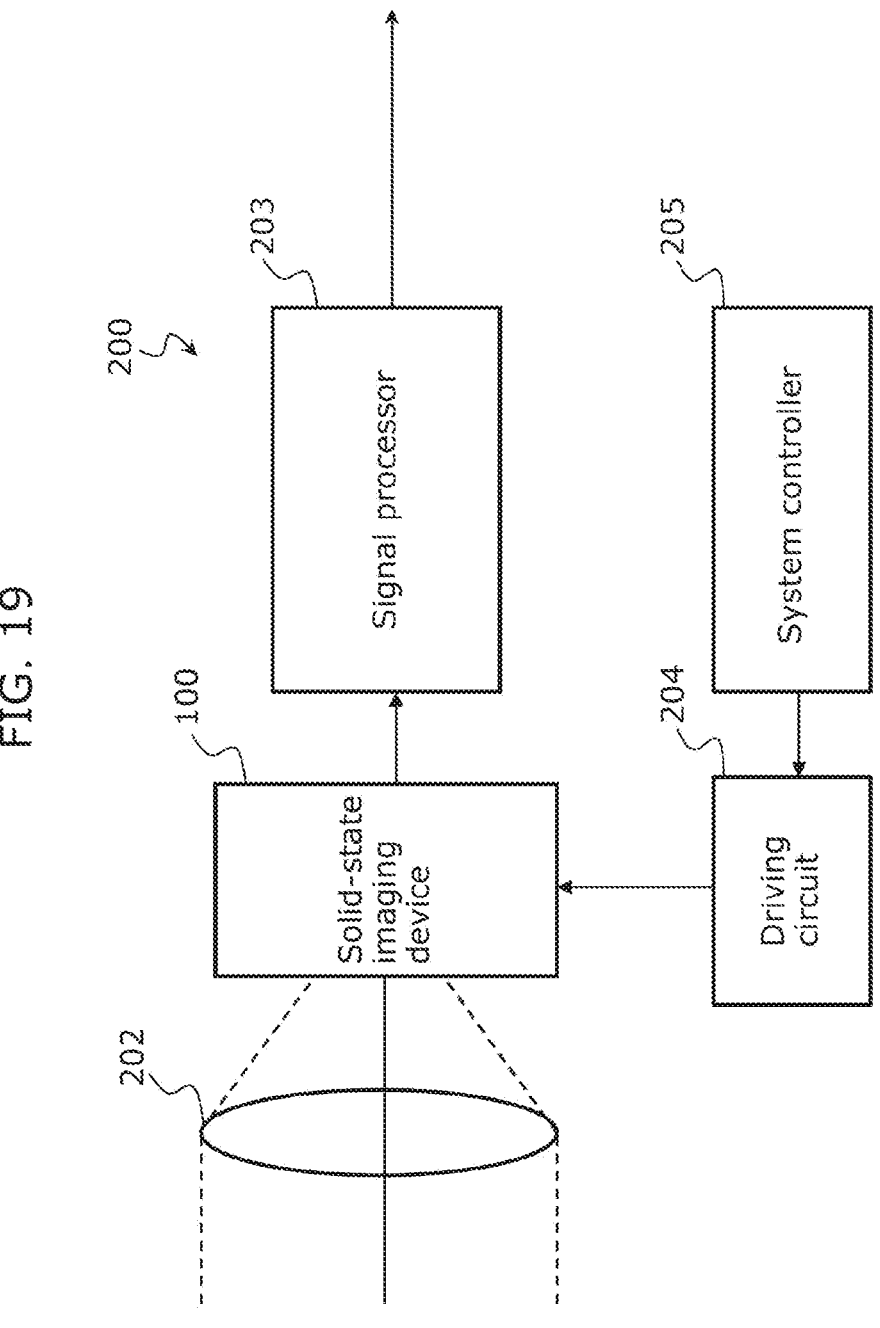
FIG. 19 is a diagram illustrating a configuration example of an imaging apparatus according to Embodiment 2.

FIG. 19 is a diagram illustrating an example of the configuration of imaging apparatus 200 in which solid-state imaging device 100 according to the embodiments is applied. The imaging apparatus illustrated in the diagram is a camera system which includes solid-state imaging device 100, imaging optical system 202 including a lens, signal processor 203, driving circuit 204, and system controller 205.

In imaging apparatus 200, solid-state imaging device 100 according to Embodiments 1 to 4 is used.

In addition, driving circuit 204 receives a control signal according to a drive mode from system controller 205 and supplies a drive mode signal to solid-state imaging device 100. In solid-state imaging device 100 to which the drive mode signal is supplied, a drive pulse corresponding to the drive mode signal is generated and supplied to each block in solid-state imaging device 100.

In addition, signal processor 203 receives an image signal output from solid-state imaging device 100, and performs various signal processing on the image signal.

In this way, the imaging apparatus according to the present embodiment includes the above-described solid-state imaging device 100, imaging optical system 202 that guides incident light from a subject to solid-state imaging device 100, and signal processor 203 that processes an output signal from solid-state imaging device 100.

As described above, in solid-state imaging device 100 according to Embodiment 2, the N signal lines may be divided into a first group and a second group, the first group may include n/2 signal lines and a signal lines out of the N signal lines, the second group may include n/2 signal lines different from the n/2 signal lines of the first group and the α signal lines identical to the α signal lines of the first group, the solid-state imaging device may further include a first column circuit and a second column circuit for each column, the first column circuit may be connected to signal lines that belong to the first group, the second column circuit may be connected to signal lines that belong to the second group, and n/2 pixel circuits corresponding to the first group may select a signal line to which a pixel signal is output, independently of n/2 pixel circuits corresponding to the second group.

According to the above-described configuration, since the signal lines to which pixel signals are output are selected independently for each group, relief of a signal line in which a failure has occurred can be performed for each group, allowing more flexible relief for signal line failures.

Here, a first switch and a second switch may be provided to each of the α signal lines, the first switch may switch between a connecting state in which one end of a corresponding signal line and the first column circuit are connected and a disconnecting state in which the one end of the corresponding signal line and the first column circuit are disconnected, the second switch may switch between a connecting state in which an other end of the corresponding signal line and the second column circuit are connected and a disconnecting state in which the other end of the corresponding signal line and the second column circuit are disconnected, and the first switch and the second switch may be not simultaneously in the connecting state.

According to the above-described configuration, the wiring load of the signal lines can be equalized for both the first column circuit and the second column circuit, irrespective of whether performing a relief operation or not, and thus it is possible to equalize the pixel signal readout time. It is possible to inhibit a decrease in frame rate due to a relief operation.

Here, a scanning circuit that scans the plurality of pixel circuits may be included, and the scanning circuit may control, for the n pixel circuits, selection of a signal line to which a pixel signal is to be output. It is possible to easily implement the connection control of N signal lines in units of one row or in units of n rows.

INDUSTRIAL APPLICABILITY

The present disclosure relates to a solid-state imaging device, and an imaging apparatus or a distance-measuring imaging device including the solid-state imaging device as an image capturing device, and is suitable, for example, for a video camera, a digital camera, a distance-measuring system, etc.

The invention claimed is:

1. A solid-state imaging device comprising:
a plurality of pixel circuits arranged in rows and columns; and
a relief unit, wherein:

the relief unit includes N signal lines and n pixel circuits among the plurality of pixel circuits, N being an integer greater than or equal to 3, n being an integer less than or equal to N,
the n pixel circuits are included in one column,
each of the n pixel circuits included in one column is connected to at least two signal lines out of the N signal lines, and selectively outputs a pixel signal to one of the at least two signal lines included, and
the n pixel circuits included in one column have mutually different connection combinations of signal lines.

2. The solid-state imaging device according to claim 1, wherein
each of the n pixel circuits includes:
an amplification transistor that outputs a pixel signal; and
selection transistors of a total number equal to a total number of the at least two signal lines, and
the selection transistors each connect an output terminal of the amplification transistor and one of the at least two signal lines.

3. The solid-state imaging device according to claim 1, wherein
the N signal lines include n signal lines of a total number equal to a total number of n pixel signals and α redundant signal lines, α being an integer greater than or equal to 1, and
each of the plurality of pixel circuits is connected to at least (1+α) signal lines.

4. The solid-state imaging device according to claim 3, wherein
an ith pixel circuit in the n pixel circuits is connected to, among the N signal lines, ith to (i+α)th signal lines in arrangement order in a column alignment direction, i being an integer from 1 to n.

5. The solid-state imaging device according to claim 1, wherein
the n pixel circuits output pixel signals in parallel, n being an integer less than N.

6. The solid-state imaging device according to claim 1, wherein
the N signal lines do not include a redundant signal line, and the n pixel circuits include at least one pixel circuit which outputs a pixel signal in a time-division manner from a signal line which is also connected to an other pixel circuit.

7. The solid-state imaging device according to claim 5, wherein
the N signal lines are divided into a first group and a second group,
the first group includes n/2 signal lines and α signal lines out of the N signal lines,
the second group includes n/2 signal lines different from the n/2 signal lines of the first group and the α signal lines identical to the α signal lines of the first group,
the solid-state imaging device further comprises a first column circuit and a second column circuit for each column,
the first column circuit is connected to signal lines that belong to the first group,
the second column circuit is connected to signal lines that belong to the second group, and
n/2 pixel circuits corresponding to the first group select a signal line to which a pixel signal is output, independently of n/2 pixel circuits corresponding to the second group.

8. The solid-state imaging device according to claim 7, further comprising:

a first switch and a second switch provided to each of the α signal lines, wherein the first switch switches between a connecting state in which one end of a corresponding signal line and the first column circuit are connected and a disconnecting state in which the one end of the corresponding signal line and the first column circuit are disconnected, the second switch switches between a connecting state in which an other end of the corresponding signal line and the second column circuit are connected and a disconnecting state in which the other end of the corresponding signal line and the second column circuit are disconnected, and the first switch and the second switch are not simultaneously in the connecting state.

9. The solid-state imaging device according to claim 1, further comprising:

a scanning circuit that scans the plurality of pixel circuits, wherein the scanning circuit controls, for the n pixel circuits, selection of a signal line to which a pixel signal is to be output.

10. The solid-state imaging device according to claim 1, further comprising:

a plurality of scanning circuits corresponding to a plurality of regions into which the plurality of pixel circuits are divided, and the plurality of scanning circuits independently control selection of a signal line to which a pixel signal is to be output.

11. The solid-state imaging device according to claim 1, further comprising:

a load element in at least two signal lines among the N signal lines, the load element being for adjusting a magnitude of a load.

12. An imaging apparatus comprising:

the solid-state imaging device according to claim 1 which captures an image of an object;

an imaging optical system that guides an incident light from the object to the solid-state imaging device; and a signal processor that processes an output signal from the solid-state imaging device.

13. The solid-state imaging device according to claim 1, wherein at least one signal line is commonly connected to two pixel circuits among the n pixel circuits included in one column.

* * * * *